(12) United States Patent
Hanaka et al.

(10) Patent No.: US 10,427,542 B2
(45) Date of Patent: Oct. 1, 2019

(54) MOBILE BODY

(71) Applicant: Murata Machinery, Ltd., Kyoto (JP)

(72) Inventors: Satoshi Hanaka, Inuyama (JP); Yasutake Yamada, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 15/752,727

(22) PCT Filed: Jul. 4, 2016

(86) PCT No.: PCT/JP2016/069791
§ 371 (c)(1),
(2) Date: Feb. 14, 2018

(87) PCT Pub. No.: WO2017/033578
PCT Pub. Date: Mar. 2, 2017

(65) Prior Publication Data
US 2018/0236895 A1 Aug. 23, 2018

(30) Foreign Application Priority Data

Aug. 21, 2015 (JP) ................................. 2015-163940

(51) Int. Cl.
*B60L 13/03* (2006.01)
*H02P 25/064* (2016.01)
(Continued)

(52) U.S. Cl.
CPC ............ *B60L 13/03* (2013.01); *H02K 11/215* (2016.01); *H02K 41/02* (2013.01); *H02K 41/033* (2013.01);
(Continued)

(58) Field of Classification Search
CPC .... H02K 41/03; H02K 11/215; H02K 41/031; H02K 41/02; H02K 41/033;
(Continued)

(56) References Cited

U.S. PATENT DOCUMENTS 4,985,651 A * 1/1991 Chitayat ................. B23Q 1/262
310/12.13
5,334,892 A * 8/1994 Chitayat ................. B23Q 1/623
310/12.06
(Continued)

FOREIGN PATENT DOCUMENTS

EP 2228629 A2 * 9/2010 ............. G01D 5/145
JP 61-15502 A 1/1986
(Continued)

OTHER PUBLICATIONS

Notice of Reasons for Refusal dated Aug. 13, 2019 of counterpart Japanese Application No. 2018-208401, along with an English translation.

*Primary Examiner* — Thai T Dinh
(74) *Attorney, Agent, or Firm* — DLA Piper LLP (US)

(57) ABSTRACT

A moving body includes: a plurality of linear motors including a first linear motor driven by magnetic interaction with magnetic flux of a magnetic pole path; a position detection sensor configured to detect a position of the moving body; a first electrical angle detection sensor disposed at a position different from the position detection sensor in a path direction of the magnetic pole path and configured to detect an electrical angle of the first linear motor; and a control unit configured to, when one of the position detection sensor and the first electrical angle detection sensor is positioned at a magnetic pole absent section, use the other of the position detection sensor and the first electrical angle detection sensor both to detect a position of the moving body and to detect an electrical angle of the first linear motor.

16 Claims, 15 Drawing Sheets

(51) Int. Cl.
*H02K 11/215* (2016.01)
*H02P 6/16* (2016.01)
*H02P 8/00* (2006.01)
*H02K 41/02* (2006.01)
*H02K 41/03* (2006.01)
*H02N 1/00* (2006.01)

(52) U.S. Cl.
CPC .............. *H02N 1/004* (2013.01); *H02P 6/16* (2013.01); *H02P 8/005* (2013.01); *H02P 25/064* (2016.02)

(58) Field of Classification Search
CPC ....... H02K 41/035; H02P 6/16; H02P 25/064; H02P 25/06; H02P 6/006; H02P 21/06; H02P 8/005
See application file for complete search history.

(56) References Cited

U.S. PATENT DOCUMENTS

| | | | | |
|---|---|---|---|---|
| 5,434,504 | A | * | 7/1995 | Hollis ................. G01B 7/003 324/207.17 |
| 5,565,718 | A | * | 10/1996 | Takei ................. H02K 41/031 310/12.02 |
| 6,720,680 | B1 | * | 4/2004 | Tanaka ................. G03F 7/70725 310/12.19 |
| 8,294,391 | B2 | * | 10/2012 | Kubo ....................... H02P 3/24 310/12.19 |
| 9,716,459 | B2 | | 7/2017 | Hanaka et al. |
| 9,729,100 | B2 | | 8/2017 | Hanaka |
| 9,768,721 | B2 | | 9/2017 | Yamada |
| 2005/0156473 | A1 | * | 7/2005 | Tosiya .................... H02P 25/06 310/120 |
| 2005/0258786 | A1 | * | 11/2005 | Kellogg ................. H02K 15/00 318/400.4 |
| 2006/0049703 | A1 | * | 3/2006 | Hosono .................. H02K 29/08 310/68 B |
| 2011/0050007 | A1 | * | 3/2011 | Kubo ....................... H02P 3/24 310/12.19 |
| 2016/0072367 | A1 | | 3/2016 | Yamada et al. |
| 2016/0072419 | A1 | | 3/2016 | Yamada et al. |

FOREIGN PATENT DOCUMENTS

| | | |
|---|---|---|
| JP | 2001-057713 A | 2/2001 |
| JP | 2003-289692 A | 10/2003 |
| JP | 2014-217076 A | 11/2014 |
| JP | 2014-217077 A | 11/2014 |
| JP | 6191665 B2 | 9/2017 |
| JP | 6206458 B2 | 10/2017 |
| JP | 6225961 B2 | 11/2017 |

* cited by examiner

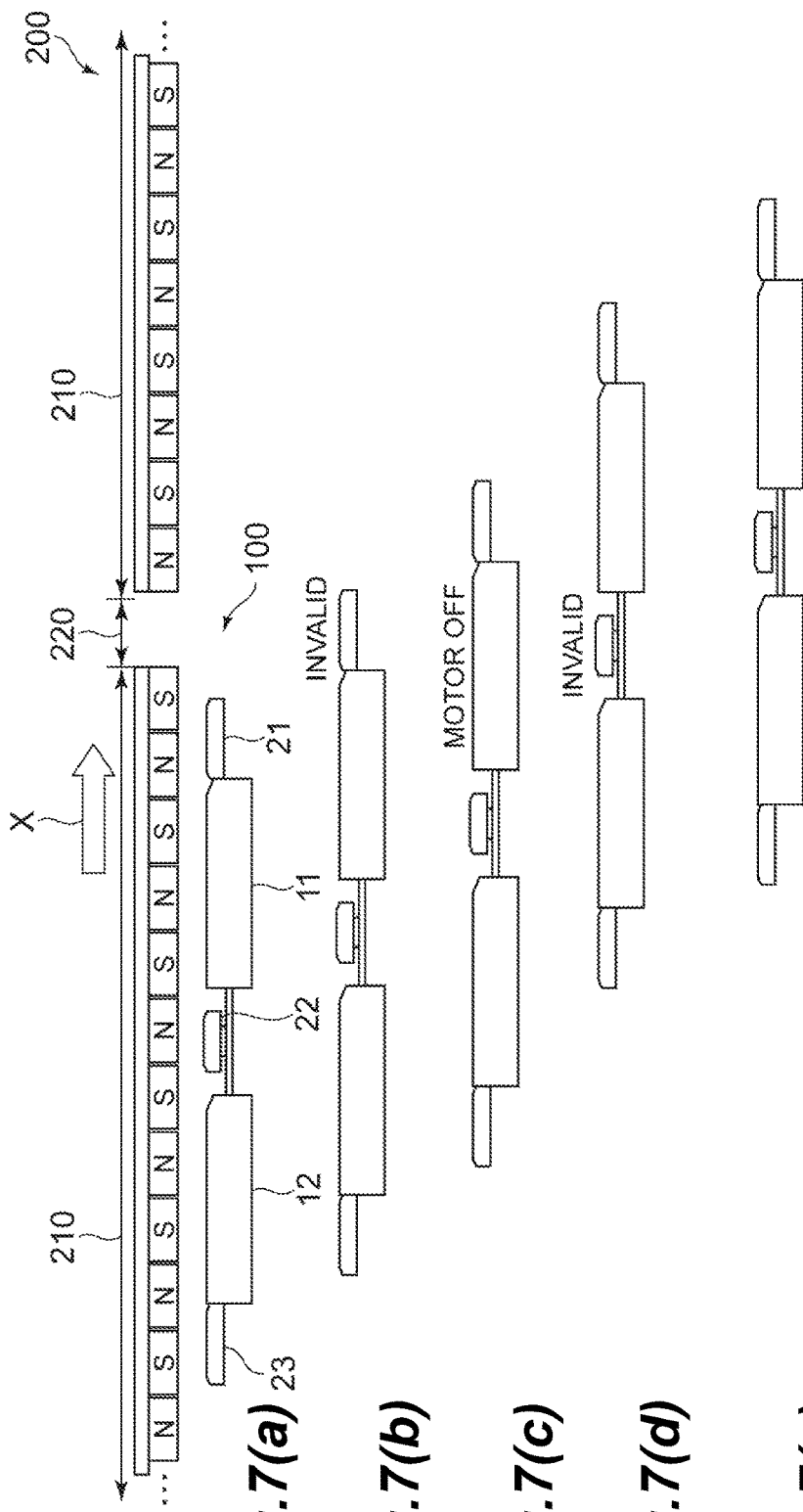

MOBILE BODY

TECHNICAL FIELD

This disclosure relates to a moving body that moves with a linear motor along a magnetic pole path in which a plurality of pairs of magnetic poles including a north pole and a south pole are arranged.

BACKGROUND

A moving body system is known, which includes a magnetic pole path in which a plurality of pairs of magnetic poles including a north pole and a south pole are arranged and a moving body having a linear motor. In the moving body system of this type, the linear motor is driven by the magnetic interaction with magnetic flux of the magnetic pole path, whereby the moving body moves along the magnetic pole path. Japanese Unexamined Patent Publication No. 2014-217077 discloses a moving body system of this type.

In the moving body system of this type, a magnetic pole absent section that lacks a magnetic pole may exist in the magnetic pole path.

In this respect, in the moving body system described in Japanese Unexamined Patent Publication No. 2014-217077, a moving body includes two linear motors, two magnet absence detection sensors (for example, photosensors) respectively corresponding to the two linear motors, and two position detection sensors (for example, Hall elements) respectively corresponding to the two linear motors. When one of the magnet absence detection sensors detects that one of the linear motors is positioned at a magnetic pole absent section, the moving body switches to the other linear motor thereby enabling continuous drive. Furthermore, when it is detected that one of the position detection sensors is positioned at a magnetic pole absent section, the moving body switches to the other position detection sensor, thereby enabling continuation of the position detection of the moving body.

We devised a moving body that includes a single position detection sensor to detect the position of the moving body and one electrical angle detection sensor for each linear motor to detect an electrical angle to control the drive of the linear motor. In this moving body, when one of the position detection sensor and the electrical angle detection sensors is positioned at a magnetic pole absent section, the position of the moving body or the electrical angle of the corresponding linear motor is unable to be detected.

It could therefore be helpful to provide a moving body in which even when any one of the position detection sensor and the electrical angle detection sensors is positioned at a magnetic pole absent section, the position of the moving body or the electrical angle of the corresponding linear motor can be detected.

SUMMARY

We thus provide:

A moving body is configured to move along a magnetic pole path having a magnetic pole section in which a plurality of pairs of magnetic poles including a north pole and a south pole are arranged and a magnetic pole absent section lacking a magnetic pole. The moving body includes: a plurality of linear motors including a first linear motor driven by magnetic interaction with magnetic flux of the magnetic pole path; a position detection sensor configured to detect a position of the moving body; a first electrical angle detection sensor disposed at a position different from the position detection sensor in a path direction of the magnetic pole path and configured to detect an electrical angle of the first linear motor; and a control unit configured to, when one of the position detection sensor and the first electrical angle detection sensor is positioned at the magnetic pole absent section, use the other of the position detection sensor and the first electrical angle detection sensor both to detect a position of the moving body and to detect an electrical angle of the first linear motor.

With this moving body, in a configuration in which the position detection sensor and the electrical angle detection sensor share the functions of detecting the position of the moving body and detecting the electrical angle of the linear motor, even when one of the position detection sensor and the electrical angle detection sensor is positioned at the magnetic pole absent section, the other sensor can recover the function by the one sensor of detecting the position of the moving body or detecting the electrical angle of the linear motor. Furthermore, it is not necessary to separately prepare an alternative sensor for detection in the magnetic pole absent section.

The linear motors may include a second linear motor disposed at a position different from the first linear motor in the path direction of the magnetic pole path. The moving body may further include a second electrical angle detection sensor disposed to sandwich the position detection sensor together with the first electrical angle detection sensor in the path direction, and configured to detect an electrical angle of the second linear motor. When the position detection sensor is positioned at the magnetic pole absent section, the control unit may switch from the position detection sensor to one of the first electrical angle detection sensor and the second electrical angle detection sensor to use the switched sensor both to detect a position of the moving body and to detect an electrical angle of the first linear motor.

With this configuration, it is possible to flexibly switch to a more appropriate sensor in accordance with the shape of the magnetic pole path or the state of the moving body.

The magnetic pole path may include a linear path and a curved path. The magnetic pole absent section may be disposed in proximity to a coupling portion between the linear path and the curved path. When the moving body moves from the linear path toward the curved path and the position detection sensor is positioned at the magnetic pole absent section, the control unit may switch to whichever of the first electrical angle detection sensor and the second electrical angle detection sensor is positioned on a back side in a moving direction of the moving body.

The magnetic pole absent section is often provided in proximity to the coupling portion between the linear path and the curved path to adjust the entire rail length and the pitch length of the magnetic pole pitch to each other. In this case, when the moving body goes over the magnetic pole absent section before the entrance of the curved path, the sensor on the back side in the linear path is used so that detection can be performed more accurately than using the sensor on the front side in the curved path.

The moving body may further include a section length estimating unit configured to estimate a section length of the magnetic pole absent section, based on a moving distance of the moving body for a period during which the one of the position detection sensor and the first electrical angle detection sensor is positioned in the magnetic pole absent section.

The moving body may further include a moving distance measuring unit configured to measure the moving distance of the moving body from output of the other sensor of the position detection sensor and the first electrical angle detection sensor. The section length estimating unit may estimate the section length of the magnetic pole absent section, based on the moving distance measured by the moving distance measuring unit.

The first electrical angle detection sensor, the first linear motor, and the position detection sensor may be disposed in order from a front side in a moving direction of the moving body. The moving body may further include: a moving distance measuring unit configured to measure a moving distance of the moving body from output of the position detection sensor after the control unit switches from the first electrical angle detection sensor to the position detection sensor when the first electrical angle detection sensor is positioned at the magnetic pole absent section; and a drive control unit configured to stop drive of the first linear motor when the moving distance measured by the moving distance measuring unit reaches a predetermined distance.

The drive of the linear motor is not turned off when the first electrical angle detection sensor comes into the magnetic pole absent section and the control unit switches to the position detection sensor, but the drive of the linear motor is turned off after further moving by a certain distance from there. Thus, reduction of thrust of the linear motor can be suppressed to a minimum.

The first electrical angle detection sensor, the first linear motor, and the position detection sensor may be disposed in order from a back side in a moving direction of the moving body. The moving body may further include a smoothing unit configured to gradually increase a synthesis ratio of output of the first electrical angle detection sensor to output of the position detection sensor while synthesizing the output of the position detection sensor and the output of the first electrical angle detection sensor when the first electrical angle detection sensor exits from the magnetic pole absent section. The control unit may gradually switch from the position detection sensor to the first electrical angle detection sensor by switching to the smoothing unit when the first electrical angle detection sensor exits from the magnetic pole absent section.

The linear motors may include a second linear motor disposed at a position different from the first linear motor in the path direction of the magnetic pole path. The moving body may further include a second electrical angle detection sensor configured to detect an electrical angle of the second linear motor. The first electrical angle detection sensor, the first linear motor, the position detection sensor, the second linear motor, and the second electrical angle detection sensor may be disposed in order in the path direction.

The position detection sensor may be formed with a magnetic pole sensor configured to output a phase angle corresponding to the magnetic flux of the magnetic pole path. The first electrical angle detection sensor may be formed with a magnetic pole sensor configured to output a phase angle corresponding to the magnetic flux of the magnetic pole path. The moving body may further include a conversion unit configured to obtain an electrical angle of the first linear motor by adding an offset angle corresponding to a distance between the first linear motor and the first electrical angle detection sensor to the phase angle output by the first electrical angle detection sensor.

The moving body may further include a magnetic pole absent section detecting unit configured to detect the magnetic pole absent section.

We provide a moving body configured to move along a magnetic pole path having a magnetic pole section in which a plurality of pairs of magnetic poles including a north pole and a south pole are arranged and a magnetic pole absent section lacking a magnetic pole, the moving body including a first linear motor driven by magnetic interaction with magnetic flux of the magnetic pole path; a second linear motor driven by magnetic interaction with magnetic flux of the magnetic pole path; a position detection sensor configured to detect a position of the moving body; a first electrical angle detection sensor configured to detect the electrical angle of the first linear motor; and a second electrical angle detection sensor configured to detect the electrical angle of the second linear motor.

We also provide a moving body configured to move along a magnetic pole path having a magnetic pole section in which a plurality of pairs of magnetic poles including a north pole and a south pole are arranged and a magnetic pole absent section lacking a magnetic pole, the moving body including a first linear motor driven by magnetic interaction with magnetic flux of the magnetic pole path; a second linear motor driven by magnetic interaction with magnetic flux of the magnetic pole path; a first magnetic pole sensor configured to detect the electrical angle of the first linear motor; a second magnetic pole sensor configured to detect the electrical angle of the second linear motor; and a third magnetic pole sensor configured to detect the position of the moving body.

Thus, even when any one of the position detection sensor and the electrical angle detection sensors is positioned at a magnetic pole absent section, the position of the moving body or the electrical angle of the corresponding linear motor can be detected.

BRIEF DESCRIPTION OF THE DRAWINGS

FIGS. 7(*a, b, c, d* and *e*) are diagrams showing an electrical angle interpolation process when the first electrical angle detection sensor enters the magnetic pole absent section first.

REFERENCE SIGNS LIST

Figure 1:
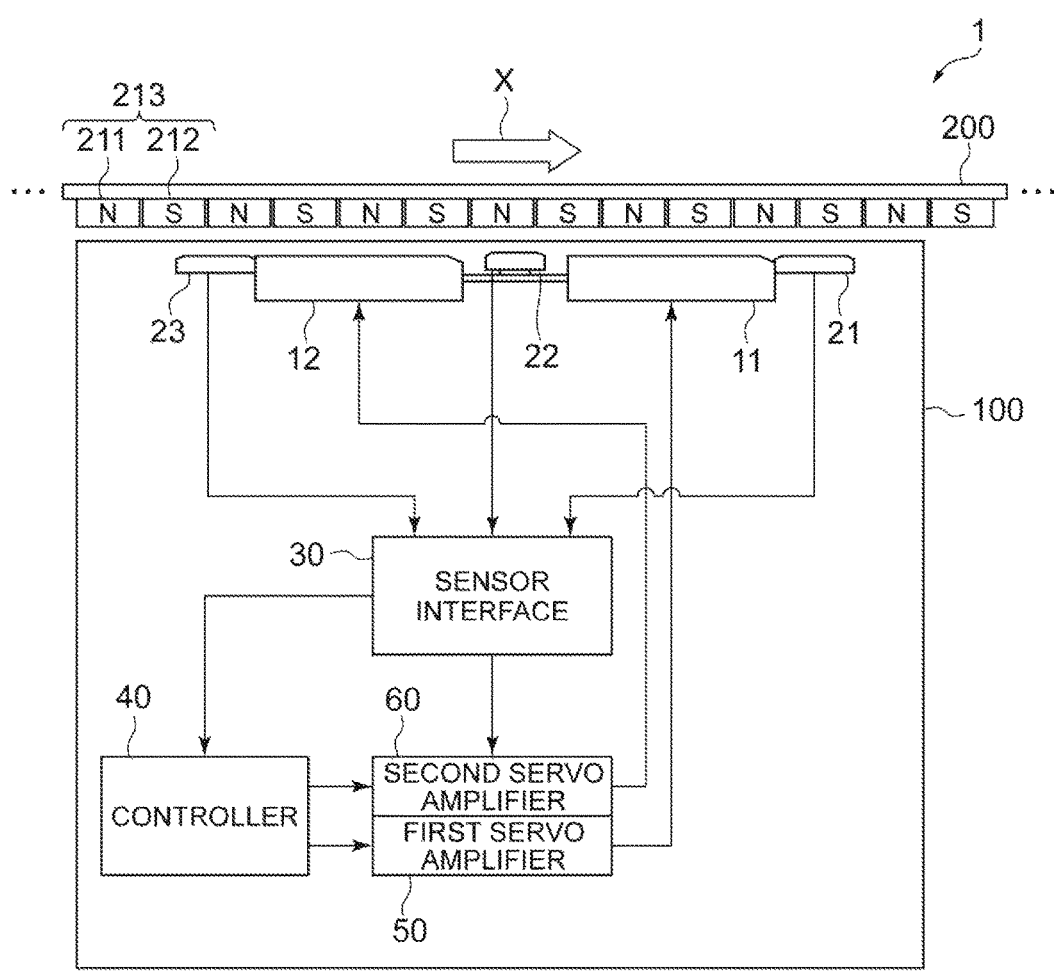
FIG. 1 is a diagram showing a moving body system according to an example.

1 . . . moving body system, 11 . . . first linear motor, 12 . . . second linear motor, 21 . . . first electrical angle detection sensor, 22 . . . position detection sensor, 22A . . . rotary encoder (position detection sensor), 23 . . . second electrical angle detection sensor, 30 . . . sensor interface, 31 . . . magnetic pole converter, 32 . . . position converter, 34 . . . moving distance measuring unit, 35 . . . section length estimating unit, 40 . . . controller, 41 . . . vehicle controller, 43 . . . motion controller, 50 . . . first servo amplifier, 51 . . . position controller, 52 . . . velocity controller, 53 . . . current controller, 54A, 54B, 54C subtractor, 55 . . . differentiator, 56 . . . inverter, 57 . . . current sensor, 60 . . . second servo amplifier, 61 . . . position controller, 62 . . . velocity controller, 63 . . . current controller, 64A, 64B, 64C subtractor, 65 . . . differentiator, 66 . . . inverter, 67 . . . current sensor, 71, 72 . . . magnetic pole absent section detecting unit, 81 . . . bogie (first bogie and second bogie), 82 . . . intermediate body, 84 . . . link, 85 . . . link, 86 . . . coupler (coupling member), 100, 100A . . . moving body, 200, 200A, 200B . . . magnetic pole path, 210 . . . magnetic pole section, 211 . . . magnet with north pole, 212 . . . magnet with south pole, 213 . . . a pair of magnetic poles, 220 . . . magnetic pole absent section, 230 . . . reflection suppression tape.

DETAILED DESCRIPTION

Referring to the drawings, examples will be described in detail. In the drawings, the same or corresponding parts are denoted by the same reference signs.

FIG. 1 is a diagram showing a moving body system according to an example and a moving body according to an example. The moving body system 1 shown in FIG. 1 includes a moving body 100 and a magnetic pole path 200.

In the magnetic pole path 200, a magnet 211 with a north pole and a magnet 212 with a south pole are alternately disposed in a row at a predetermined pitch (for example, 33 mm). In other words, in the magnetic pole path 200, a plurality of pairs of magnetic poles 213 including a north pole and a south pole are arranged. The moving body 100 moves along the magnetic pole path 200 with a linear motor.

An example of the moving body system 1 is a ceiling traveling vehicle system in which a carriage (moving body) 100 travels along a rail (magnetic pole path) 200 installed on the ceiling. The moving body system 1 of this type may include a rail 200 of a few kilometers and 300 to 400 carriages 100. The moving body may be a carriage travelling on the ground or may not be a carriage. For example, the moving body may be a vehicle other than the carriage or a robot arm.

Figure 3A:
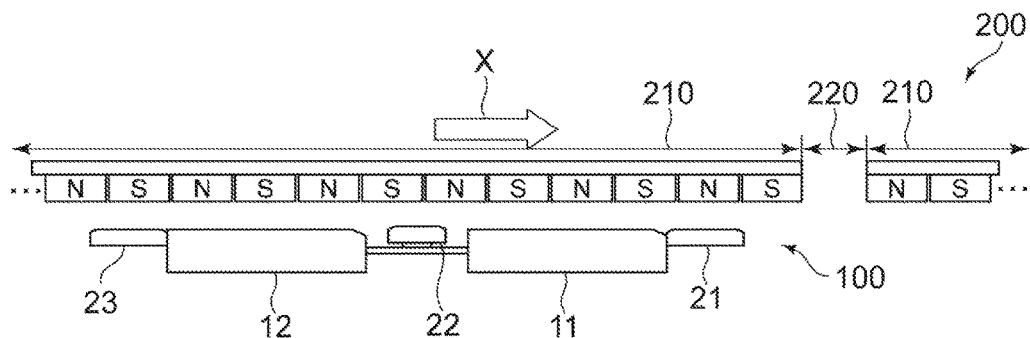
FIGS. 3(*a, b* and *c*) are diagrams showing the operation of the magnetic pole converter (conversion unit, control unit, smoothing unit) shown in FIG. 2, specifically, the operation of the magnetic pole converter when a first electrical angle detection sensor is not positioned at a magnetic pole absent section.
Figure 3B:
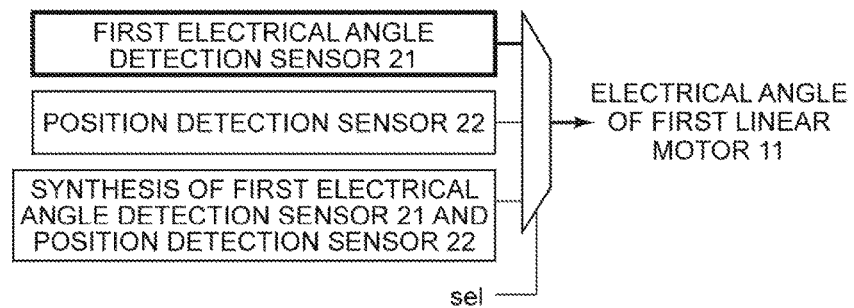
Figure 3C:
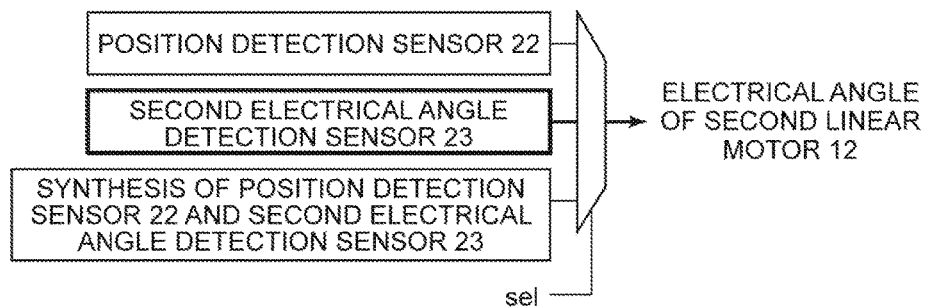

In the moving body system of this type, the length of the magnetic pole path varies, for example, depending on the factory layout and is not always an integral multiple of the predetermined pitch (for example, 33 mm). Moreover, it is difficult to arrange magnets at the predetermined pitch (for example, 33 mm) in a coupling portion between a linear path and a curved path in the magnetic pole path. Because of such reasons, as shown in FIGS. 3(*a, b* and *c*) to FIGS. 6(*a* and *b*), the magnetic pole path 200 has a magnetic pole section 210 in which a plurality of pairs of magnetic poles 213 are arranged at a predetermined pitch (for example, 66 mm) and a magnetic pole absent section 220 that lacks a magnetic pole.

Figure 2:
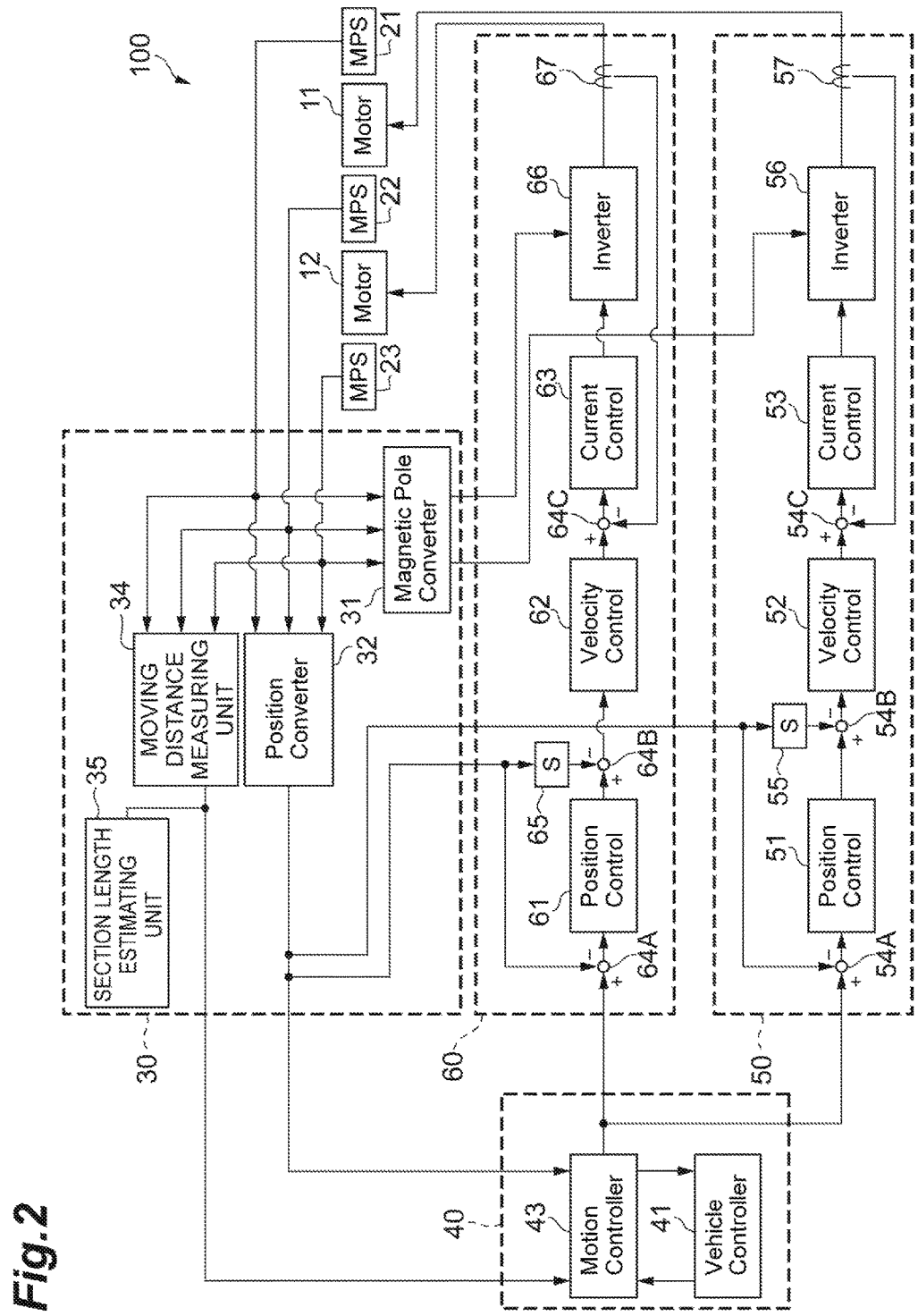
FIG. 2 is a diagram showing a moving body in the moving body system shown in FIG. 1.

FIG. 2 is a diagram showing the moving body in the moving body system shown in FIG. 1. The moving body 100 shown in FIG. 1 and FIG. 2 includes first and second linear motors 11 and 12, first and second electrical angle detection sensors 21 and 23, a position detection sensor 22, a sensor interface 30, a controller 40, and first and second servo amplifiers 50 and 60. In this example, the first electrical angle detection sensor 21, the first linear motor 11, the position detection sensor 22, the second linear motor 12, and the second electrical angle detection sensor 23 are disposed in order from the front side in the moving direction X of the moving body.

The first and second linear motors 11 and 12 are, for example, three-phase linear motors and driven by the magnetic interaction with magnetic flux of the magnetic pole path 200. The magnetic field of the first linear motor 11 is controlled by alternating drive current from the first servo amplifier 50. The magnetic field of the second linear motor 12 is controlled by alternating drive current from the second servo amplifier 60. The first linear motor 11 and the second linear motor 12 are disposed at different positions in the moving direction (the conveyance direction of the magnetic pole path 200) X of the moving body 100.

The first electrical angle detection sensor 21 is a magnetic pole sensor (MPS) configured to detect a magnetic pole in the magnetic pole path 200 and includes, for example, a Hall element. With such a configuration, the first electrical angle detection sensor 21 outputs a phase angle corresponding to the magnetic flux of the magnetic pole path 200, where a pair of magnetic poles 213 including a north pole and a south pole is one cycle. As will be described later, the phase angle output by this magnetic pole sensor is mainly used for the electrical angle of the first linear motor 11 and thus this magnetic pole sensor is referred to as a first electrical angle detection sensor.

Similarly, the second electrical angle detection sensor 23 is a magnetic pole sensor (MPS) configured to detect a magnetic pole in the magnetic pole path 200 and includes, for example, a Hall element. With such a configuration, the second electrical angle detection sensor 23 outputs a phase angle corresponding to the magnetic flux of the magnetic pole path 200, where a pair of magnetic poles 213 including a north pole and a south pole is one cycle. As will be described later, the phase angle output by this magnetic pole sensor is mainly used for the electrical angle of the second linear motor 12 and thus this magnetic pole sensor is referred to as a second electrical angle detection sensor.

The position detection sensor 22 is a magnetic pole sensor (MPS) configured to detect a magnetic pole in the magnetic pole path 200 and includes, for example, a Hall element. With such a configuration, the position detection sensor 22 outputs a phase angle corresponding to the magnetic flux of the magnetic pole path 200, where a pair of magnetic poles 213 including a north pole and a south pole is one cycle. As will be described later, the phase angle output by this magnetic pole sensor is mainly used for position detection of the moving body 100 and thus this magnetic pole sensor is referred to as a position detection sensor.

The first and second electrical angle detection sensors 21 and 23 and the position detection sensor 22 have the function of determining whether they are positioned at the magnetic pole absent section 220, based on the detected magnetic flux of the magnetic pole path 200. The first and second electrical angle detection sensors 21 and 23 and the position detection sensor 22 output a signal (Validation) indicating that the output is a valid state when not positioned at the magnetic pole absent section 220, and outputs a signal (Invalidation) indicating that the output is an invalid state when positioned at the magnetic pole absent section.

The first electrical angle detection sensor 21, the position detection sensor 22, and the second electrical angle detection sensor 23 are disposed at different positions in the moving direction (the conveyance direction of the magnetic pole path 200) X of the moving body 100. The first electrical angle detection sensor 21 and the second electrical angle detection sensor 23 are disposed to cooperate such that the position detection sensor 22 is sandwiched therebetween in the moving direction (the conveyance direction of the magnetic pole path 200) X of the moving body 100. In other words, the second electrical angle detection sensor 23 is disposed to sandwich the position detection sensor 22 together with the first electrical angle detection sensor 21 in the moving direction X of the moving body 100.

In this way, in this example, a single sensor for detecting the electrical angle of a linear motor is provided for one linear motor, and a single sensor for detecting the position of the moving body is provided for the moving body.

The sensor interface 30 has a magnetic pole converter 31, a position converter 32, a moving distance measuring unit 34, and a section length estimating unit 35. The magnetic pole converter 31 and the position converter 32 function as the conversion unit and the control unit. The magnetic pole converter 31 functions as the smoothing unit.

FIGS. 3(a, b and c) are diagrams showing the operation of the magnetic pole converter (conversion unit, control unit, smoothing unit) shown in FIG. 2, specifically, the operation of the magnetic pole converter when the first electrical angle detection sensor is not positioned at a magnetic pole absent section. FIGS. 4(a and b) are diagrams showing the operation of the magnetic pole converter (conversion unit, control unit, smoothing unit) shown in FIG. 2, specifically, the operation of the magnetic pole converter when the first electrical angle detection sensor is positioned at a magnetic pole absent section.

The magnetic pole converter 31 functions as a conversion unit as illustrated below. As shown in FIG. 3(a), when the first electrical angle detection sensor 21 is not positioned at the magnetic pole absent section 220, the magnetic pole converter 31 receives a valid state signal (Validation) from the first electrical angle detection sensor 21 and, as shown in FIG. 3(b), derives the electrical angle (Magnetic Pole) of the magnetic field of the first linear motor 11 to obtain thrust through the magnetic interaction, that is, the electrical angle of the drive current of the first linear motor 11, based on the phase angle output by the first electrical angle detection sensor 21. Specifically, the magnetic pole converter 31 obtains the electrical angle of the first linear motor 11 by adding the offset angle corresponding to the distance between the first linear motor 11 and the first electrical angle detection sensor 21 to the phase angle output by the first electrical angle detection sensor 21. The magnetic pole converter 31 supplies the derived electrical angle (Magnetic Pole) of the first linear motor 11 to the first servo amplifier 50.

Figure 4A:
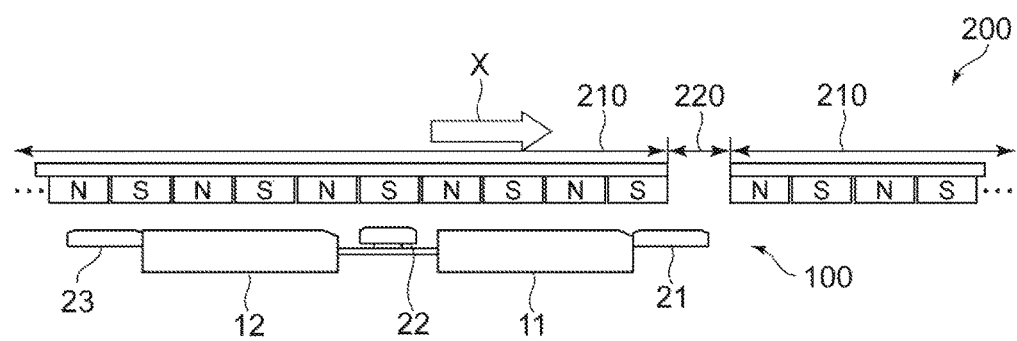
FIGS. 4(*a* and *b*) are diagrams showing the operation of the magnetic pole converter (conversion unit, control unit, smoothing unit) shown in FIG. 2, specifically, the operation of the magnetic pole converter when the first electrical angle detection sensor is positioned at a magnetic pole absent section.
Figure 4B:
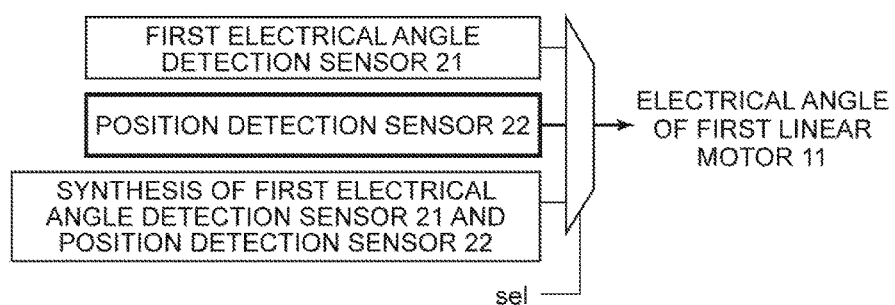

The magnetic pole converter 31 functions as a control unit (selector) as illustrated below. As shown in FIG. 4(a), when the first electrical angle detection sensor 21 is positioned at the magnetic pole absent section 220, the magnetic pole converter 31 receives an invalid state signal (Invalidation) from the first electrical angle detection sensor 21 and, as shown in FIG. 4(b), switches from the output of the first electrical angle detection sensor 21 to the output of the position detection sensor 22 to interpolate the electrical angle of the first linear motor 11. In this example, the magnetic pole converter 31 performs two kinds of electrical angle interpolation processes, as illustrated below.

First Electrical Angle Interpolation Process

The magnetic pole converter 31 periodically captures a phase angle from the electrical angle detection sensor and derives the electrical angle of the linear motor. Thus, in the first electrical angle interpolation process, the electrical angle at present of the first linear motor 11 is obtained by adding the displacement amount of the phase angle detected by the position detection sensor 22 after switching to the electrical angle before switching (the electrical angle derived based on the phase angle detected by the first electrical angle detection sensor 21). This first electrical angle interpolation process is used when, of the linear motor and the electrical angle detection sensor thereof, the electrical angle detection sensor enters a magnetic pole absent section first, in other words, when the electrical angle detection sensor thereof enters a magnetic pole absent section when the linear motor is being driven.

Second Electrical Angle Interpolation Process

In the second electrical angle interpolation process, the electrical angle of the first linear motor 11 is directly derived based on the phase angle output by the position detection sensor 22. Specifically, the magnetic pole converter 31 derives the electrical angle of the first linear motor 11 by adding the offset angle corresponding to the distance between the position detection sensor 22 and the first linear motor 11 to the phase angle output by the position detection sensor 22. This second electrical angle interpolation process is used when, of the linear motor and the electrical angle detection sensor thereof, the linear motor enters a magnetic pole absent section first, in other words, when the electrical angle detection sensor enters a magnetic pole absent section after the drive of the linear motor is stopped.

The magnetic pole converter 31 functions as a smoothing unit and synthesizes the output of the position detection sensor 22 and the output of the first electrical angle detection sensor 21 such that the synthesis ratio of the output of the first electrical angle detection sensor 21 to the output of the position detection sensor 22 is gradually increased when the first electrical angle detection sensor 21 exits from the magnetic pole absent section 220. As will be described later, this smoothing process is used when the output of the first electrical angle detection sensor 21 is used immediately after the first electrical angle detection sensor 21 returns from the invalid state to the valid state, and is used in combination with the second electrical angle interpolation process.

Similarly, the magnetic pole converter 31 functions as a conversion unit, receives a valid state signal (Validation) from the second electrical angle detection sensor 23 when the second electrical angle detection sensor 23 is not positioned at the magnetic pole absent section 220, as shown in FIG. 3(a), and derives the electrical angle (Magnetic Pole) of the magnetic field of the second linear motor 12 to obtain thrust through the magnetic interaction, that is, the electrical angle of the drive current of the second linear motor 12, based on the phase angle output by the second electrical angle detection sensor 23, as shown in FIG. 3(*c*). Specifically, the magnetic pole converter 31 obtains the electrical angle of the second linear motor 12 by adding the offset angle corresponding to the distance between the second linear motor 12 and the second electrical angle detection sensor 23 to the phase angle output by the second electrical angle detection sensor 23. The magnetic pole converter 31 supplies the derived electrical angle (Magnetic Pole) of the second linear motor 12 to the second servo amplifier 60.

The magnetic pole converter 31 functions as a control unit (selector) and, when the second electrical angle detection sensor 23 is positioned at the magnetic pole absent section 220, receives an invalid state signal (Invalidation) from the second electrical angle detection sensor 23 and switches from the output of the second electrical angle detection sensor 23 to the output of the position detection sensor 22 to interpolate the electrical angle of the second linear motor 12. In this example, the magnetic pole converter 31 performs two kinds of electrical angle interpolation processes, as illustrated below.

First Electrical Angle Interpolation Process

The magnetic pole converter 31 periodically captures a phase angle from the electrical angle detection sensor and derives the electrical angle of the linear motor. For this purpose, in the first electrical angle interpolation process, the electrical angle at present of the second linear motor 12 is obtained by adding the displacement amount of the phase angle detected by the position detection sensor 22 after switching to the electrical angle before switching (the electrical angle derived based on the phase angle detected by the second electrical angle detection sensor 23). This first electrical angle interpolation process is used when, of the linear motor and the electrical angle detection sensor thereof, the electrical angle detection sensor enters the magnetic pole absent section first, in other words, when the electrical angle detection sensor enters the magnetic pole absent section when the linear motor is being driven.

Second Electrical Angle Interpolation Process

In the second electrical angle interpolation process, the electrical angle of the second linear motor 12 is directly derived based on the phase angle output by the position detection sensor 22. Specifically, the magnetic pole converter 31 derives the electrical angle of the second linear motor 12 by adding the offset angle corresponding to the distance between the position detection sensor 22 and the second linear motor 12 to the phase angle output by the position detection sensor 22. This second electrical angle interpolation process is used when, of the linear motor and the electrical angle detection sensor thereof, the linear motor enters the magnetic pole absent section first, in other words, when the electrical angle detection sensor enters the magnetic pole absent section after the drive of the linear motor is stopped.

The magnetic pole converter 31 functions as a smoothing unit and synthesizes the output of the position detection sensor 22 and the output of the second electrical angle detection sensor 23 such that the synthesis ratio of the output of the second electrical angle detection sensor 23 to the output of the position detection sensor 22 is gradually increased when the second electrical angle detection sensor 23 exits from the magnetic pole absent section 220. As will be described later, this smoothing process is used when the output of the second electrical angle detection sensor 23 is used immediately after the second electrical angle detection sensor 23 returns from the invalid state to the valid state, and is used in combination with the second electrical angle interpolation process.

In this way, the magnetic pole converter 31 functions as a control unit and uses the position detection sensor 22 both to detect the position of the moving body 100 and to detect the electrical angle of the first or second linear motor 11, 12 as described later. With this configuration, even when the first or second electrical angle detection sensor 21, 23 is positioned at the magnetic pole absent section 220 and in an invalid state, the electrical angle is interpolated by the position detection sensor 22, and the drive of the corresponding first or second linear motor can be continued.

Figure 5A:
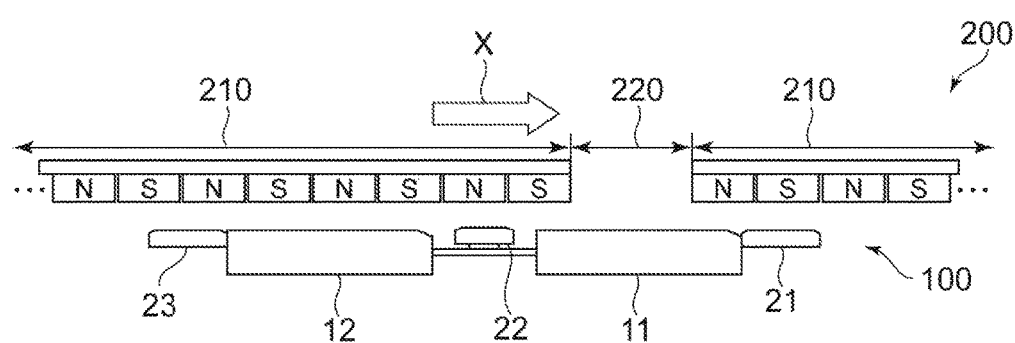
FIGS. 5(*a* and *b*) are diagrams showing the operation of the position converter (conversion unit, control unit) shown in FIG. 2, specifically, the operation of the position converter when a position detection sensor is not positioned at a magnetic pole absent section.
Figure 5B:
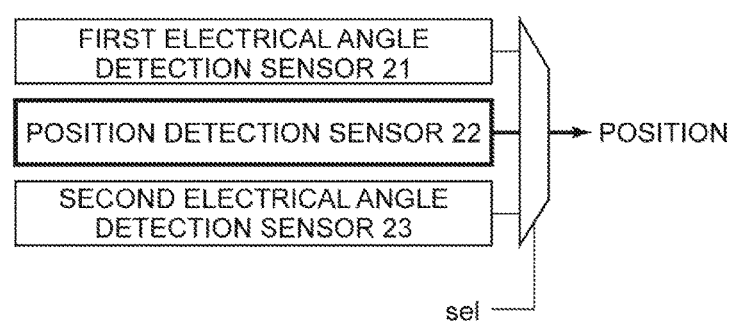
Figure 6A:
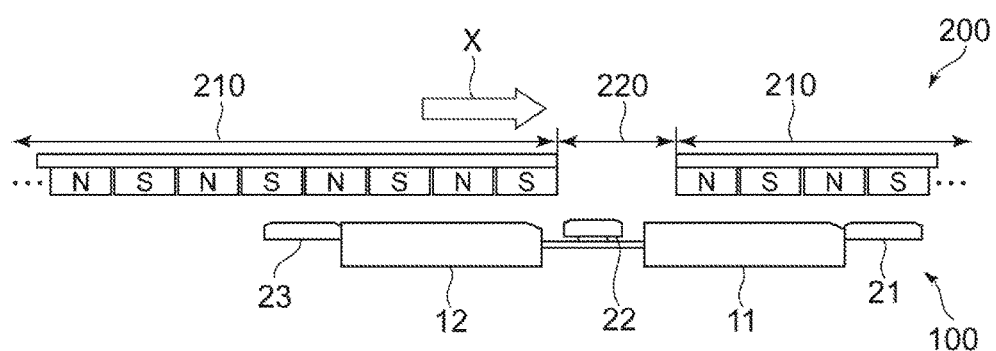
FIGS. 6(*a* and *b*) are diagrams showing the operation of the position converter (conversion unit, control unit) shown in FIG. 2, specifically, the operation of the position converter when the position detection sensor is positioned at a magnetic pole absent section.
Figure 6B:
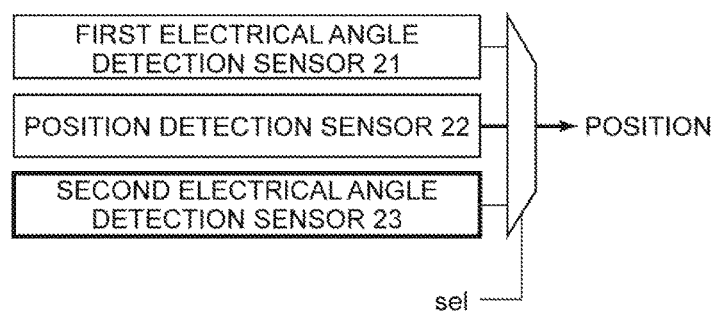

FIGS. 5(*a* and *b*) are diagrams showing the operation of the position converter (conversion unit, control unit) shown in FIG. 2, specifically, the operation of the position converter when the position detection sensor is not positioned at the magnetic pole absent section. FIGS. 6(*a* and *b*) are diagrams showing the operation of the position converter (conversion unit, control unit) shown in FIG. 2, specifically, the operation of the position converter when the position detection sensor is positioned at the magnetic pole absent section.

The position converter 32 functions as a conversion unit as illustrated below. As shown in FIG. 5(*a*), when the position detection sensor 22 is not positioned at the magnetic pole absent section 220, the position converter 32 receives a valid state signal (Validation) from the position detection sensor 22 and, as shown in FIG. 5(*b*), derives the position (Position) of the moving body 100 based on the phase angle output by the position detection sensor 22 and a predetermined pitch length (for example, 66 mm) of a pair of magnetic poles 213. The position converter 32 supplies the derived position (Position) of the moving body 100 to the controller 40 and the first and second servo amplifiers 50 and 60. The position converter 32 supplies a signal (Validation/Invalidation) indicating a valid state/invalid state from the first and second electrical angle detection sensors 21 and 23 and the position detection sensor 22 to the controller 40.

The position converter 32 functions as a control unit (selector) as illustrated below. As shown in FIG. 6(*a*), when the position detection sensor 22 is positioned at the magnetic pole absent section 220, the position converter 32 receives an invalid state signal (Invalidation) from the position detection sensor 22 and, as shown in FIG. 6(*b*), switches from the output of the position detection sensor 22 to the output of the second electrical angle detection sensor 23 to interpolate the position (Position) of the moving body 100. In this position interpolation process, the position of the moving body 100 is directly derived based on the phase angle output by the second electrical angle detection sensor 23. Specifically, the position converter 32 derives the position of the moving body 100 based on the offset angle corresponding to the distance between the position detection sensor 22 and the second electrical angle detection sensor 23, in addition to the phase angle output by the second electrical angle detection sensor 23 and a predetermined pitch length (for example, 66 mm) of a pair of magnetic poles 213.

The position converter 32 may obtain the position information at present by adding the displacement amount of the phase angle detected by the electrical angle detection sensor after switching to the position information before switching (the displacement amount of the phase angle detected by the position detection sensor). With this configuration, the position with high continuity can be derived even when the sensors are switched over.

In this way, the position converter 32 functions as a control unit and uses the first or second electrical angle detection sensor 21, 23 both to detect the electrical angle of the first or second linear motor 11, 12 and to detect the position of the moving body 100. Thus, even when the position detection sensor 22 is positioned at the magnetic pole absent section 220 and in the invalid state, the position is interpolated by the first or second electrical angle detection sensor 21, 23, and the position information can be output seamlessly.

Here, the magnetic pole path may include a linear path and a curved path, and the magnetic pole absent section may be disposed in proximate to the coupling portion between the linear path and the curved path (on the periphery of the coupling portion or the position close to the coupling portion). In this manner, when the moving body 100 moves from a linear path toward a curved path, if the position detection sensor 22 is positioned at the magnetic pole absent section 220, the position may be interpolated by the second electrical angle detection sensor 23 positioned on the back side in the moving direction X of the moving body 100, that is, the second electrical angle detection sensor 23 positioned on the linear path. The position may be interpolated by the first electrical angle detection sensor 21 depending on the method of driving the linear motor and the characteristics of the moving body structure.

When the first electrical angle detection sensor 21 is positioned at the magnetic pole absent section 220, that is, when an invalid state signal (Invalidation) is received from the first electrical angle detection sensor 21, to put yet another way, after the magnetic pole converter (control unit) 31 switches from the first electrical angle detection sensor 21 to the position detection sensor 22, the moving distance measuring unit 34 starts measuring the moving distance of the moving body 100 based on the output (phase angle) of the position detection sensor 22 and supplies the measured moving distance of the moving body 100 to the section length estimating unit 35 and the controller 40.

Similarly, when the second electrical angle detection sensor 23 is positioned at the magnetic pole absent section 220, that is, when an invalid state signal (Invalidation) is received from the second electrical angle detection sensor 23, to put yet another way, after the magnetic pole converter (control unit) 31 switches from the second electrical angle detection sensor 23 to the position detection sensor 22, the moving distance measuring unit 34 starts measuring the moving distance of the moving body 100 based on the output (phase angle) of the position detection sensor 22 and supplies the measured moving distance of the moving body 100 to the section length estimating unit 35 and the controller 40.

When the position detection sensor 22 is positioned at the magnetic pole absent section 220, that is, when an invalid state signal (Invalidation) is received from the position detection sensor 22, after the position detection sensor 22 is switched to the second electrical angle detection sensor 23 by the position converter (control unit) 32, the moving distance measuring unit 34 starts measuring the moving distance of the moving body 100 based on the output (phase angle) of the first or second electrical angle detection sensor 21, 23 and supplies the measured moving distance of the moving body 100 to the section length estimating unit 35 and the controller 40.

The section length estimating unit 35 estimates the section length of the magnetic pole absent section based on the moving distance of the moving body 100 measured by the moving distance measuring unit 34. Specifically, the section length of the magnetic pole absent section is estimated based on the moving distance of the moving body 100 from when an invalid state signal (Invalidation) is received from the first and second electrical angle detection sensors 21 and 23 and the position detection sensor 22 to when a valid state (Validation) is received, that is, for a period during which the first and second electrical angle detection sensors 21 and 23 and the position detection sensor 22 are positioned at the magnetic pole absent section 220. The section length estimating unit 35 may set the moving distance of the moving body measured by the moving distance measuring unit 34, as it is, as the section length of the magnetic pole absent section.

The controller 40 has a vehicle controller 41 and a motion controller 43.

The vehicle controller 41 acquires drive control information for the moving body such as target position, target velocity, and target stop-distance, from an upper-level controller (not shown) and stores the acquired information in advance. The vehicle controller 41 supplies such information to the motion controller 43.

When receiving a valid state signal (Validation) of the first electrical angle detection sensor 21 from the position converter 32, the motion controller 43 supplies a position command (Command Position) for reaching a command position to the first servo amplifier 50, based on the position information at present (Position) from the position converter 32. In contrast, when receiving an invalid state signal (Invalidation) of the first electrical angle detection sensor 21 from the position converter 32, the motion controller 43 keeps supplying a position command (Command Position) for reaching a command position to the first servo amplifier 50, based on the position information at present (Position) from the position converter 32, until the first linear motor 11 reaches the magnetic pole absent section 220, specifically, for example, until the moving distance measured by the moving distance measuring unit 34 reaches a predetermined distance (until a certain time has elapsed). Then, when the first linear motor 11 is positioned at the magnetic pole absent section 220, specifically, for example, when the moving distance measured by the moving distance measuring unit 34 reaches a predetermined distance (after the elapse of a certain time), the motion controller 43 stops supplying the position command (Command Position) to the first servo amplifier 50. The above-noted predetermined distance (certain time) may be preset based on the distance between the first electrical angle detection sensor 21 and the first linear motor 11.

Similarly, when receiving a valid state signal (Validation) of the second electrical angle detection sensor 23 from the position converter 32, the motion controller 43 supplies a position command (Command Position) for reaching a command position to the second servo amplifier 60, based on the position information at present (Position) from the position converter 32. In contrast, when receiving an invalid state signal (Invalidation) of the second electrical angle detection sensor 23 from the position converter 32, the motion controller 43 keeps supplying a position command (Command Position) for reaching a command position to the second servo amplifier 60, based on the position information at present (Position) from the position converter 32, until the second linear motor 12 reaches the magnetic pole absent section 220, specifically, for example, until the moving distance measured by the moving distance measuring unit 34 reaches a predetermined distance (until a certain time has elapsed). Then, when the second linear motor 12 is positioned at the magnetic pole absent section 220, specifically, for example, when the moving distance measured by the moving distance measuring unit 34 reaches a predetermined distance (after the elapse of a certain time), the motion controller 43 stops supplying the position command (Command Position) to the second servo amplifier 60. The above-noted predetermined distance (certain time) may be preset based on the distance between the second electrical angle detection sensor 23 and the second linear motor 12.

The first servo amplifier (drive control unit) 50 includes a position controller 51, a velocity controller 52, a current controller 53, subtractors 54A, 54B, and 54C, a differentiator 55, an inverter 56, and a current sensor 57.

The subtractor 54A obtains the difference between the target position indicated by the position command from the motion controller 43 and the present position indicated by the position information from the position converter 32, and the obtained data (differential position data) is input to the position controller 51. The position controller 51 outputs velocity data corresponding to this differential position data.

The differentiator 55 differentiates the position information from the position converter 32, the subtractor 54B obtains the difference between this differential data and the velocity data from the position controller 51, and the obtained data (differential velocity data) is input to the velocity controller 52. The velocity controller 52 outputs current value data corresponding to this differential velocity data.

The current sensor 57 detects the current value at present of the first linear motor 11, the subtractor 54C obtains the difference between the current value data from the velocity controller 52 and feedback data corresponding to the current value at present (real current value) from the current sensor 57, and the obtained data (differential current value data) is input to the current controller 53. The current controller 53 outputs direct drive current corresponding to this differential current value data.

The inverter 56 converts the direct drive current from the current controller 53 into alternating drive current, based on the electrical angle of the first linear motor 11 from the magnetic pole converter 31, to generate drive current for driving the first linear motor 11. An example of the inverter 56 is a three-phase inverter using an intelligent power module (IPM).

Similarly, the second servo amplifier (drive control unit) 60 includes a position controller 61, a velocity controller 62, a current controller 63, subtractors 64A, 64B, and 64C, a differentiator 65, an inverter 66, and a current sensor 67.

The subtractor 64A obtains the difference between the target position indicated by the position command from the motion controller 43 and the present position indicated by the position information from the position converter 32, and the obtained data (differential position data) is input to the position controller 61. The position controller 61 outputs velocity data corresponding to this differential position data.

The differentiator 65 differentiates the position information from the position converter 32, the subtractor 64B obtains the difference between this differential data and the velocity data from the position controller 61, and the obtained data (differential velocity data) is input to the velocity controller 62. The velocity controller 62 outputs current value data corresponding to this differential velocity data.

The current sensor 67 detects the current value at present of the second linear motor 12, the subtractor 64C obtains the difference between the current value data from the velocity controller 62 and feedback data corresponding to the current value at present (real current value) from the current sensor 67, and the obtained data (differential current value data) is input to the current controller 63. The current controller 63 outputs direct drive current corresponding to this differential current value data.

The inverter 66 converts the direct drive current from the current controller 63 into alternating drive current, based on the electrical angle of the second linear motor 12 from the magnetic pole converter 31, to generate drive current for driving the second linear motor 12. An example of the inverter 66 is a three-phase inverter using an intelligent power module (IPM).

The operation of the moving body 100 of this example will now be described. FIGS. 7(*a, b, c, d* and *e*) are diagrams showing an electrical angle interpolation process when the first electrical angle detection sensor enters a magnetic pole absent section first. FIGS. 8(*a, b, c, d* and *e*) are diagrams showing an electrical angle interpolation process when the position detection sensor enters a magnetic pole absent section first. On the precondition that the moving body 100 moves with two-motor drive of the first linear motor 11 and the second linear motor 12, when one of the first linear motor 11 and the second linear motor 12 is positioned at a magnetic pole absent section, the other linear motor alone is driven to move along the magnetic pole path 200.

(1) When the first electrical angle detection sensor 21 enters the magnetic pole absent section 220 first First, as shown in FIG. 7(*a*), when neither the first electrical angle detection sensor 21 nor the position detection sensor 22 is positioned at the magnetic pole absent section 220 and the first electrical angle detection sensor 21 and the position detection sensor 22 output a valid state signal (Validation), the magnetic pole converter 31 derives the electrical angle of the first linear motor 11 based on the phase angle from the first electrical angle detection sensor 21, and the position converter 32 derives the position (Position) of the moving body 100 based on the phase angle from the position detection sensor 22. Then, the first linear motor 11 is driven by the motion controller 43 and the first servo amplifier 50.

Subsequently, as shown in FIG. 7(*b*), when the first electrical angle detection sensor 21 is positioned at the magnetic pole absent section 220 and the first electrical angle detection sensor 21 outputs an invalid state signal (Invalidation), the electrical angle of the first linear motor 11 is interpolated by adding the displacement amount (the amount of movement) of the phase angle from the position detection sensor 22 from the previous time to the present time to the previously derived electrical angle, through the first electrical angle interpolation process by the magnetic pole converter 31. According to this process, the first linear motor 11 is kept driven by the motion controller 43 and the first servo amplifier 50.

The moving distance of the moving body since an invalid state signal (invalidation) is received from the first electrical angle detection sensor 21 is measured by the moving distance measuring unit 34 based on the output of the position detection sensor 22. When the measured moving distance reaches a predetermined distance stored in advance (the amount of movement equivalent to the distance between the first electrical angle detection sensor 21 and the first linear motor 11) (after the elapse of a certain time), as shown in FIG. 7(*c*), the first linear motor 11 is positioned at the magnetic pole absent section 220 and thus the drive of the first linear motor 11 is stopped by the motion controller 43 and the first servo amplifier 50. At this point of time, the second linear motor 12 is not positioned at the magnetic pole absent section 220, and the drive is continued by the motion controller 43 and the second servo amplifier 60, based on the electrical angle derived by the magnetic pole converter 31. The above-noted electrical angle is derived by the magnetic pole converter 31 based on the phase angle detected by the second electrical angle detection sensor 23. The first electrical angle detection sensor 21 is out of the magnetic pole absent section 220 and thus returns to a valid state.

The section length estimating unit 35 calculates the distance of the magnetic pole absent section 220 (calculates the magnetic pole absent section length), based on the moving distance, measured by the moving distance measuring unit 34, from when an invalid state signal (invalidation) is received from the first electrical angle detection sensor 21 to when a valid state signal (Validation) is received.

Subsequently, when the moving distance measured by the moving distance measuring unit 34 reaches a predetermined distance stored in advance (the amount of movement equivalent to the motor length of the first linear motor 11) (after the elapse of a certain time), as shown in FIG. 7(d), the first linear motor 11 exits from the magnetic pole absent section 220 and thus the drive of the first linear motor 11 is resumed by the motion controller 43 and the first servo amplifier 50, based on the electrical angle derived by the magnetic pole converter 31. At this point of time, the magnetic pole converter 31 switches from the position detection sensor 22 to the first electrical angle detection sensor 21 and derives the electrical angle of the first linear motor 11 based on the phase angle detected by the first electrical angle detection sensor 21.

As shown in FIG. 7(d), when the position detection sensor 22 is positioned at the magnetic pole absent section 220 and the position detection sensor 22 outputs an invalid state signal (Invalidation), the position of the moving body 100 is interpolated by switching the output (phase angle) of the position detection sensor 22 to the output (phase angle) of the second electrical angle detection sensor 23, through the position interpolation process by the position converter 32.

Subsequently, as shown in FIG. 7(e), when the position detection sensor 22 exits from the magnetic pole absent section 220 and the position detection sensor 22 outputs a valid state signal (Validation), the position converter 32 switches from the output (phase angle) of the second electrical angle detection sensor 23 back to the output (phase angle) of the position detection sensor 22 to derive the position of the moving body 100.

The operation described above is the operation when the first electrical angle detection sensor 21 enters the magnetic pole absent section 220 first at the time of forward movement in the moving direction X of the moving body 100 with the drive by the first linear motor 11, that is, when, of the first linear motor 11 and the first electrical angle detection sensor 21 for detecting the electrical angle thereof, the first electrical angle detection sensor 21 enters the magnetic pole absent section 220 first. The operation is similar when the second electrical angle detection sensor 23 enters the magnetic pole absent section 220 first at the time of backward movement in the moving direction X of the moving body 100 with the drive by the second linear motor 12 (at the time of movement in the direction opposite to the moving direction X), that is, when, of the second linear motor 12 and the second electrical angle detection sensor 23 for detecting the electrical angle thereof, the second electrical angle detection sensor 23 enters the magnetic pole absent section 220 first.

Figure 8A:
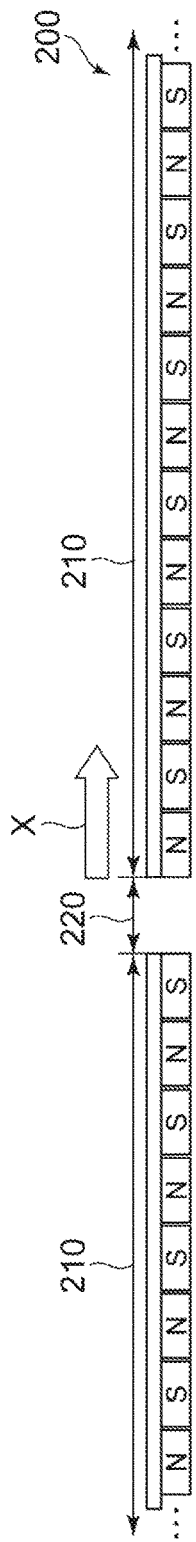
FIGS. 8(*a, b, c, d* and *e*) are diagrams showing an electrical angle interpolation process when the position detection sensor enters the magnetic pole absent section first.

(2) When the position detection sensor 22 enters the magnetic pole absent section 220 first First, as shown in FIG. 8(a), when the first linear motor 11 is positioned at the magnetic pole absent section 220 and the position detection sensor 22 and the second electrical angle detection sensor 23 output a valid state signal (Validation), the magnetic pole converter 31 derives the electrical angle of the second linear motor 12 based on the phase angle from the second electrical angle detection sensor 23, and the position converter 32 derives the position (Position) of the moving body 100 based on the phase angle from the position detection sensor 22. Then, the second linear motor 12 is driven by the motion controller 43 and the second servo amplifier 60.

Figure 8B:
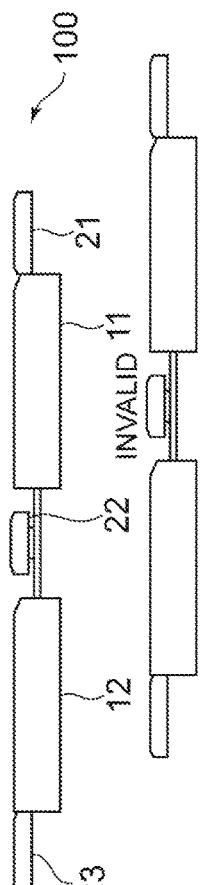

Subsequently, as shown in FIG. 8(b), when the position detection sensor 22 is positioned at the magnetic pole absent section 220 and the position detection sensor 22 outputs an invalid state signal (invalidation), the position of the moving body 100 is interpolated by switching from the output (phase angle) of the position detection sensor 22 to the output (phase angle) of the second electrical angle detection sensor 23 through the position interpolation process by the position converter 32.

Figure 8C:
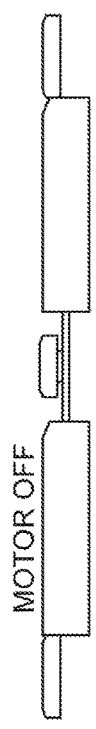

The moving distance of the moving body since an invalid state signal (Validation) is received from the position detection sensor 22 is measured by the moving distance measuring unit 34 based on the output of the second electrical angle detection sensor 23. When the measured moving distance reaches a predetermined distance stored in advance (the amount of movement equivalent to the distance between the position detection sensor 22 and the second linear motor 12) (after the elapse of a certain time), as shown in FIG. 8(c), the second linear motor 12 is positioned at the magnetic pole absent section 220 and thus the drive of the second linear motor 12 is stopped by the motion controller 43 and the second servo amplifier 60. At this point of time, the first linear motor 11 is not positioned at the magnetic pole absent section 220 and the drive is continued by the motion controller 43 and the first servo amplifier 50 based on the electrical angle derived by the magnetic pole converter 31. The above-noted electrical angle is derived by the magnetic pole converter 31 based on the phase angle detected by the first electrical angle detection sensor 21. Furthermore, at this point of time, the position detection sensor 22 is out of the magnetic pole absent section 220 and thus returns to a valid state, and the position converter 32 switches from the output of the second electrical angle detection sensor 23 (phase angle) back to the output of the position detection sensor 22 (phase angle) to derive the position of the moving body 100.

The distance of the magnetic pole absent section 220 is calculated (the magnetic pole absent section length is calculated) by the section length estimating unit 35 based on the moving distance, measured by the moving distance measuring unit 34, from when an invalid state signal (Invalidation) is received from the position detection sensor 22 to when a valid state signal (Validation) is received.

Figure 8D:
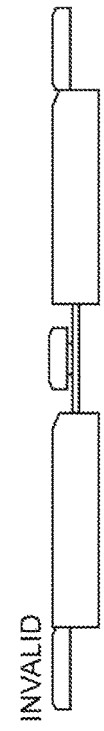

Subsequently, when the moving distance measured by the moving distance measuring unit 34 reaches a predetermined distance stored in advance (the amount of movement equivalent to the motor length of the second linear motor 12 and the distance between the second linear motor 12 and the second electrical angle detection sensor 23) (after the elapse of a certain time), as shown in FIG. 8(d), the second linear motor 12 exits from the magnetic pole absent section 220 and the second electrical angle detection sensor 23 is positioned at the magnetic pole absent section 220. Accordingly, since the second electrical angle detection sensor 23 outputs an invalid state signal (Invalidation), the electrical angle of the second linear motor 12 is interpolated by directly deriving the electrical angle of the second linear motor 12 based on the phase angle output by the position detection sensor 22, through the second electrical angle interpolation process by the magnetic pole converter 31. According to this process, the drive of the second linear motor is resumed by the motion controller 43 and the second servo amplifier 60.

Figure 8E:
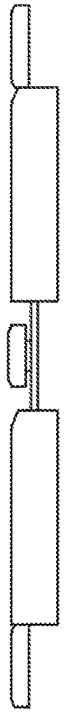

Subsequently, as shown in FIG. 8(e), when the second electrical angle detection sensor 23 exits from the magnetic pole absent section 220 and the second electrical angle detection sensor 23 outputs a valid state signal (Validation), the output of the position detection sensor 22 and the output of the second electrical angle detection sensor 23 are synthesized through the smoothing function by the magnetic pole converter 31 such that the synthesis ratio of the output of the second electrical angle detection sensor 23 to the output of the position detection sensor 22 is gradually increased. In this way, the output of the position detection sensor 22 is gradually switched to the output of the second electrical angle detection sensor 23 immediately after return in accordance with, for example, a moving distance in a range of the pitch length (66 mm) of a pair of magnetic poles. This configuration suppresses the problem of discontinuous electrical angles caused by suddenly switching the position detection sensor 22 to the second electrical angle detection sensor 23 since the detection points of the position detection sensor 22 and the second electrical angle detection sensor 23 are different from each other, and smooth electrical angle detection can be performed even before and after switching.

The operation described above is the operation when the position detection sensor 22 enters the magnetic pole absent section 220 first at the time of forward movement in the moving direction X of the moving body with the drive by the second linear motor 12, that is, when, of the second linear motor 12 and the second electrical angle detection sensor 23 for detecting the electrical angle thereof, the second linear motor 12 enters the magnetic pole absent section 220 first. The operation is similar when the position detection sensor 22 enters the magnetic pole absent section 220 first at the time of backward movement in the moving direction X of the moving body with the drive by the first linear motor 11, that is, when, of the first linear motor 11 and the first electrical angle detection sensor 21 for detecting the electrical angle thereof, the first electrical angle detection sensor 21 enters the magnetic pole absent section 220 first.

As described above, in the moving body 100 of this example, in a configuration that allows the position detection sensor and the electrical angle detection sensor to share the functions of detecting the position of the moving body and detecting the electrical angle of the linear motor, even when one of the position detection sensor and the electrical angle detection sensor is positioned at a magnetic pole absent section, the other sensor can recover the function by the one sensor of detecting the position of the moving body or detecting the electrical angle of the linear motor. Furthermore, it is not necessary to separately prepare an alternative sensor for detection in the magnetic pole absent section.

In the moving body 100 of this example, the drive of the linear motor is not turned off when the electrical angle detection sensor comes into the magnetic pole absent section and the control unit switches to the position detection sensor, but the drive of the linear motor is turned off after further moving by a predetermined distance from there. Thus, reduction of thrust of the linear motor can be suppressed to a minimum.

Our mobile bodies are not limited to the example described above and are susceptible to various modifications. For example, in this example, the phase angle detected by the magnetic pole sensor (the first and second electrical angle detection sensors and the position detection sensor) is set as position information (Position). Alternatively, the displacement amount of the phase angle detected by the magnetic pole sensor may be set as position information (Position). For example, the displacement amount of the phase angle from any given reference position, that is, the amount of movement may be set as position information (Position). More specifically, the phase angle detected by the position detection sensor (during interpolation, the electrical angle detection sensor) is periodically acquired by the position converter 32 to obtain the displacement amount of the phase angle, which is then output as position information to the controller 40 and the servo amplifiers 50 and 60. The reference position may be a movement start position of the moving body or may be coordinates information acquired by scanning barcodes discretely disposed on the rail with a reader provided in the moving body.

In this case, the controller 40 and the servo amplifiers 50 and 60 use the displacement amount of the phase angle from any given reference position, that is, the amount of movement, as the present position information (Position). Specifically, the motion controller 43 supplies information indicating the amount of movement as a position command (Command Position) to the servo amplifiers 50 and 60. The servo amplifiers 50 and 60 generate drive current for driving the linear motor, from the target position indicated by the position command from the motion controller 43, the present position indicated by the amount of movement as position information from the position converter 32, and feedback data corresponding to the real current value of the linear motor detected by the current sensor.

In addition to the configuration of this example, the configuration as follows (FIGS. 9(a and b), FIGS. 11(a and b)) may be further included.

Figure 9A:
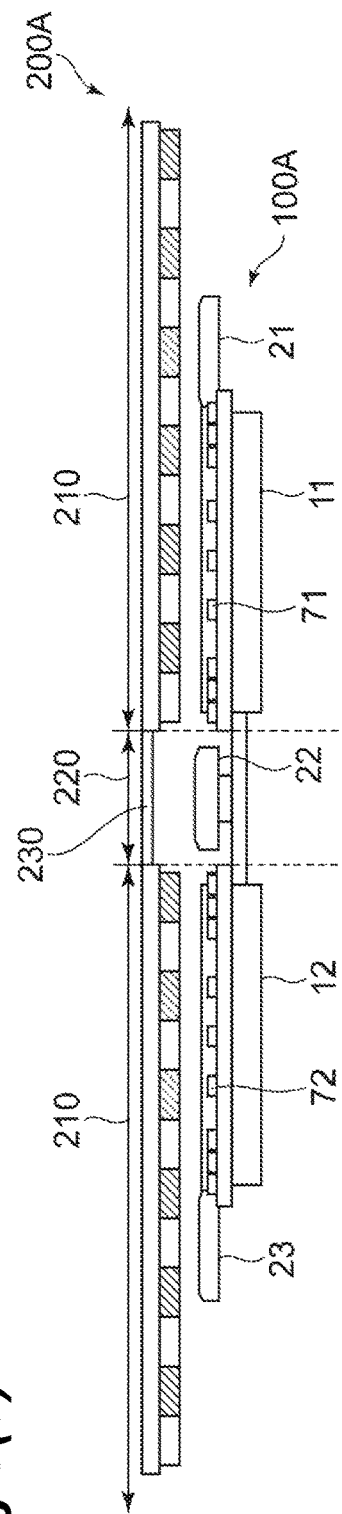
FIGS. 9(*a* and *b*) are diagrams showing the main part of a moving body system according to a modification.
Figure 9B:
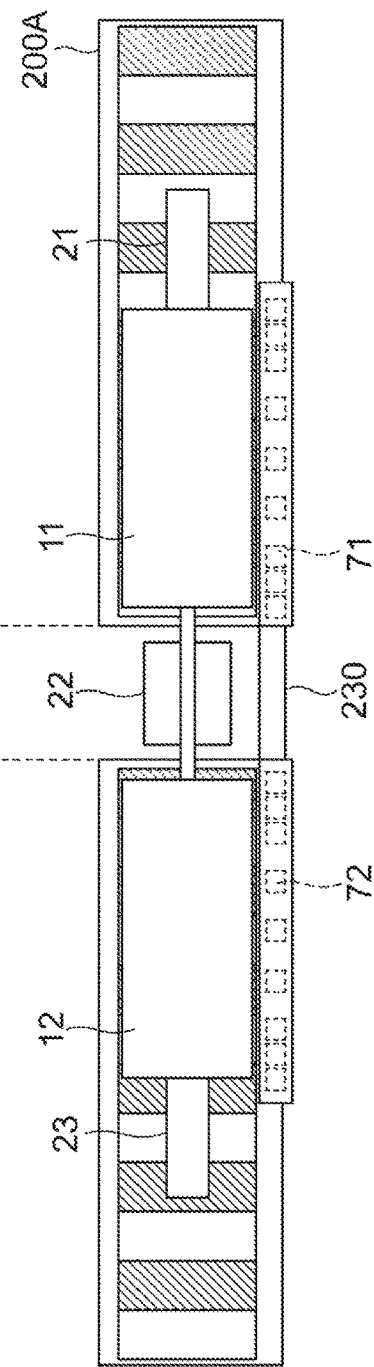

FIGS. 9(a and b) are diagrams showing the main part of a moving body system according to a modification to the example. As shown in FIGS. 9(a and b), a moving body 100A further includes magnetic pole absent section detecting units 71 and 72 in the moving body 100. A reflection suppression tape 230 may be affixed to the magnetic pole absent section 220 of a magnetic pole path 200A.

The magnetic pole absent section detecting unit 71 includes nine reflective photosensors arranged in the moving direction on the side of the first linear motor 11. The reflective photosensor is, for example, a reflective photosensor having a light-projecting portion and a light-receiving portion for projecting light to a metal portion with high reflection intensity such as the rail, the back yoke of the magnet plate, or the magnet cover, and receiving the reflection light. These photosensors receive reflection light from the back yoke of the metal magnet plate with high reflection intensity to turn on in the magnetic pole section 210, and they receive relatively weak reflection light from the reflection suppression tape 230 to turn off in the magnetic pole absent section 220.

Figure 10:
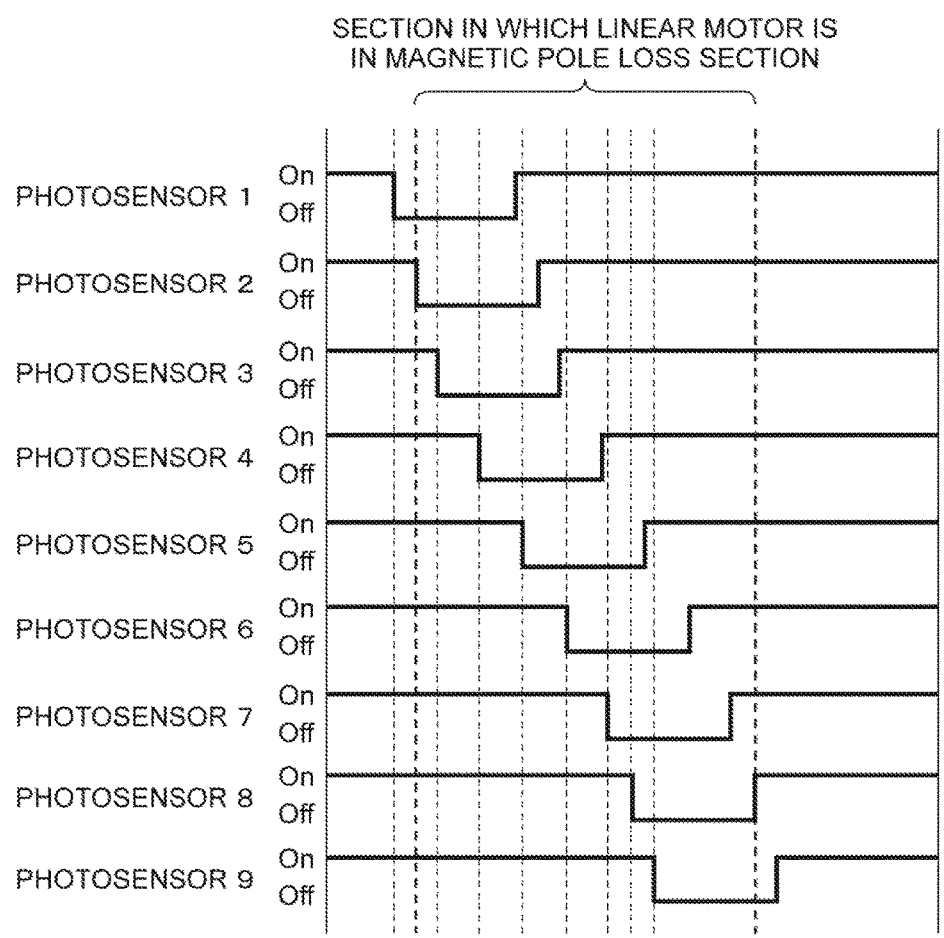
FIG. 10 is a timing chart of photosensors in the magnetic pole absent section detecting unit shown in FIGS. 9(*a* and *b*).

FIG. 10 shows a timing chart of these photosensors. In FIG. 10, the photosensors are denoted as 1 to 9 in order from the front side in the moving direction. To avoid detection of a state in which there exists no reflection light, for example, at the joint of magnetic pole units, for example, it may be determined that the magnetic pole absent section detecting unit 71 is positioned on the magnetic pole absent section 220 when two or more photosensors are in the off state.

Figure 11A:
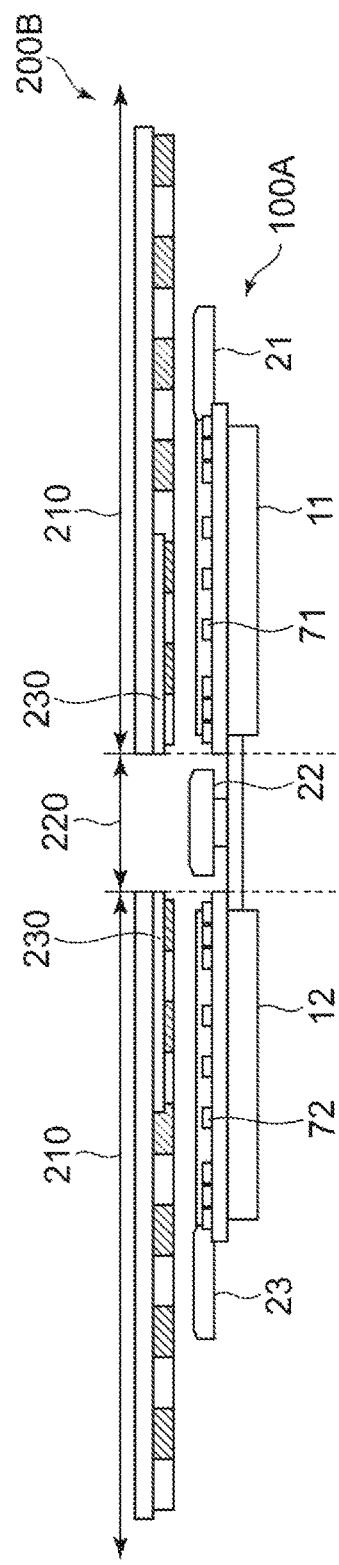
FIGS. 11(*a* and *b*) are diagrams showing the main part of a moving body system according to a modification.
Figure 11B:
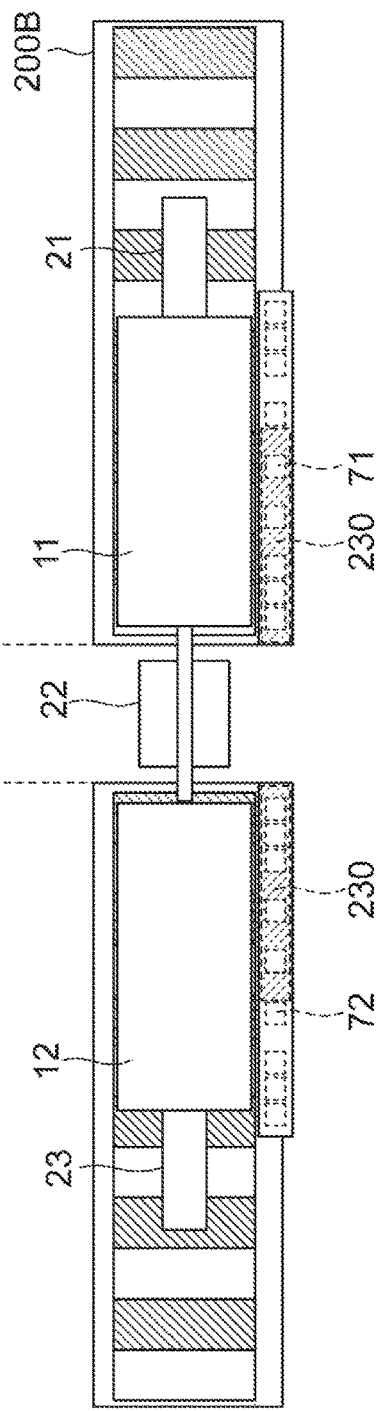

FIGS. 11(a and b) are diagrams showing the main part of a moving body system according to another modification to the example. As shown in FIGS. 11(a and b), reflection suppression tapes 230 may be affixed in front and back of the magnetic pole absent section 220 of the magnetic pole path 200B, rather than at the magnetic pole absent section of the magnetic pole path.

Figure 12:
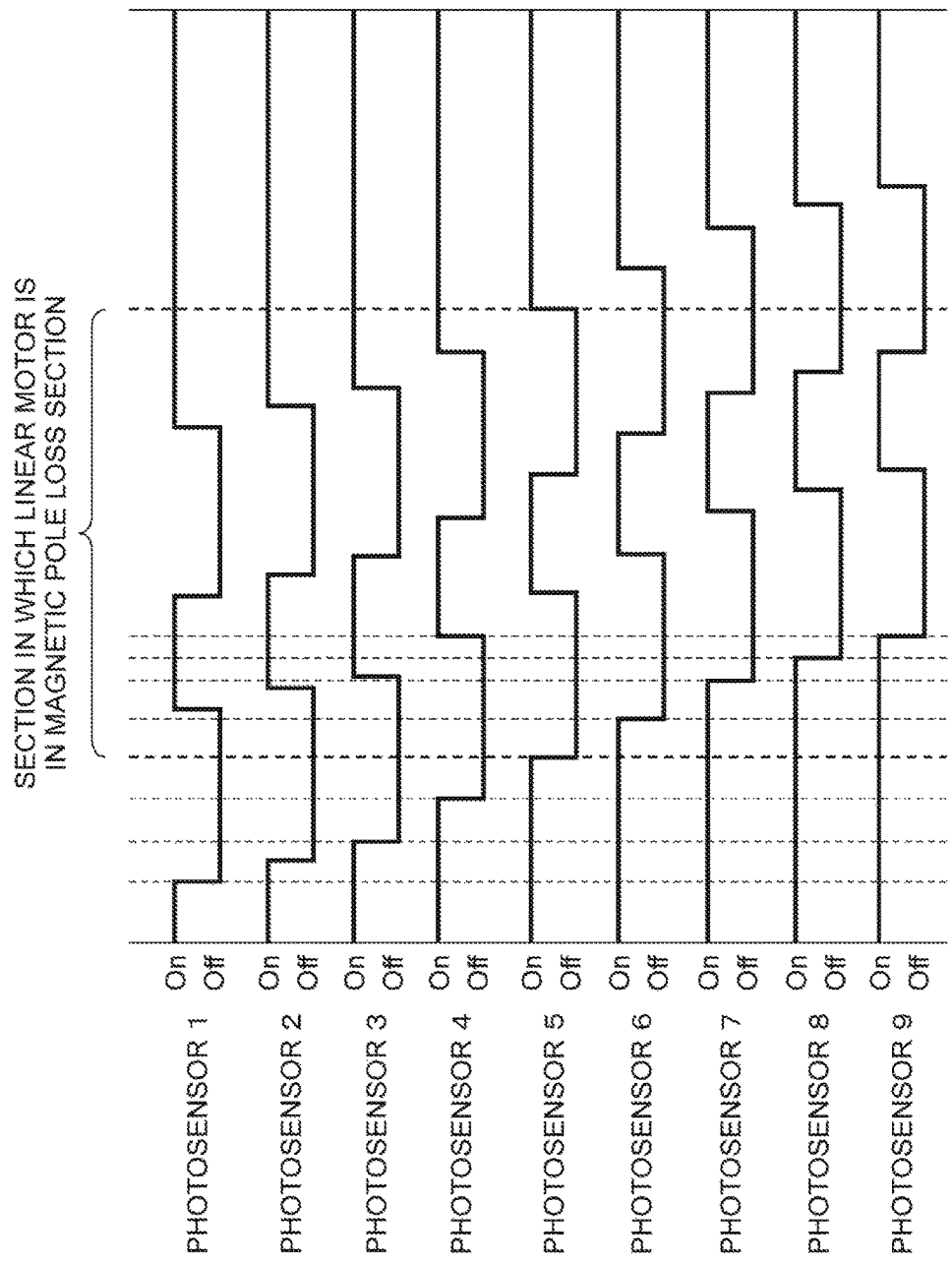
FIG. 12 is a timing chart of photosensors in the magnetic pole absent section detecting unit shown in FIGS. 11(*a* and *b*).

FIG. 12 shows a timing chart of the photosensors. Also in FIG. 12, photosensors are denoted as 1 to 9 in order from the front side in the moving direction. To avoid detection error resulting from irregular reflection of light at a fastener screw in the magnetic pole path, or contamination or projections and depressions during passage on the magnet cover at a branch or curved rail, it may be determined that the magnetic pole absent section detecting unit 71 is positioned at the magnetic pole absent section 220 when other patterns excluding the following patterns are detected:

the photosensor 1 off, and the photosensor 2 off the photosensor 1 off, and the photosensor 2 off, and the photosensor 3 off the photosensor 1 off, and the photosensor 2 off, and the photosensor 3 off, and the photosensor 4 off the photosensor 6 off, and the photosensor 7 off, and the photosensor 8 off, and the photosensor 9 off the photosensor 7 off, and the photosensor 8 off, and the photosensor 9 off the photosensor 8 off, and the photosensor 9 off Here, for example, when a magnetic pole path in a factory is constructed in units of four pairs of magnetic poles, a magnetic pole absent section exists between these magnetic pole units. As shown in FIGS. 9(*a* and *b*), when a reflection suppression tape is affixed to the magnetic pole absent section, the tape is affixed after the construction. In contrast, as shown in FIGS. 11(*a* and *b*), when reflection suppression tapes are affixed in front and back of the magnetic pole absent section, the tapes can be affixed in units of magnetic pole units before construction, which is advantageous in that the workability in construction is relatively good. On the other hand, as shown in FIGS. 11(*a* and *b*), when reflection suppression tapes are affixed in front and back of the magnetic pole absent section, the tapes are affixed at two places, whereas as shown in FIGS. 9(*a* and *b*), when a reflection suppression tape is affixed in the magnetic pole absent section, the tape is affixed at one place, and the length of the tape can be reduced.

In the foregoing modifications, a reflection suppression tape is affixed in the magnetic pole absent section of the magnetic pole path or in front and back of the magnetic pole absent section. Alternatively, a reflective tape may be affixed instead of a reflection suppression tape.

In the foregoing modifications, a plurality of reflective photosensors are used as magnetic pole absent section detecting units. Alternatively, a plurality of Hall elements may be used instead of a plurality of reflective photosensors. In this case, a plurality of Hall elements may be disposed in the inside of the linear motor. A Hall element may be separately provided as a magnetic pole absent section detecting unit in the inside of the magnetic pole sensor.

In this example, it is assumed that the resolution of the first and second electrical angle detection sensors and the resolution of the position detection sensor are equal. However, when the resolution of the first and second electrical angle detection sensors is different from the resolution of the position detection sensor, that is, when interpolation is performed between sensors with different resolutions, correction is performed such that the output of the sensor that is to interpolate is adjusted to the resolution of the sensor that is to be interpolated.

Figure 13:
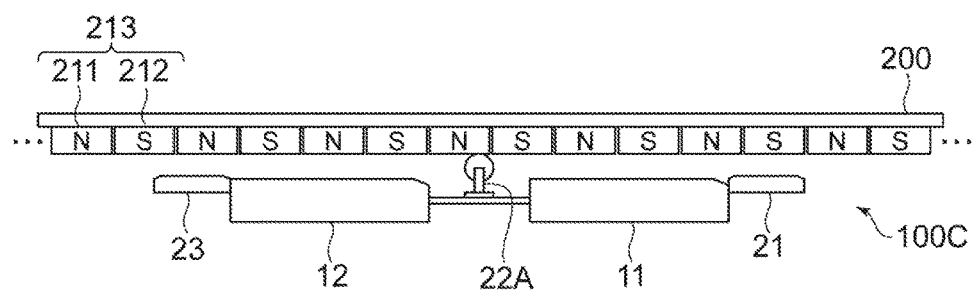
FIG. 13 is a diagram showing the main part of a moving body system according to a modification.

Although a Hall element is illustrated as the position detection sensor 22 in this example, a rotary encoder 22A may be used as the position detection sensor as shown in FIG. 13. In this case, one rotation of the rotary encoder may correspond to one cycle of the Hall element for detecting electrical angle.

Although the moving body having two linear motors has been illustrated in this example, the moving body may include three or more linear motors.

Figure 14A:
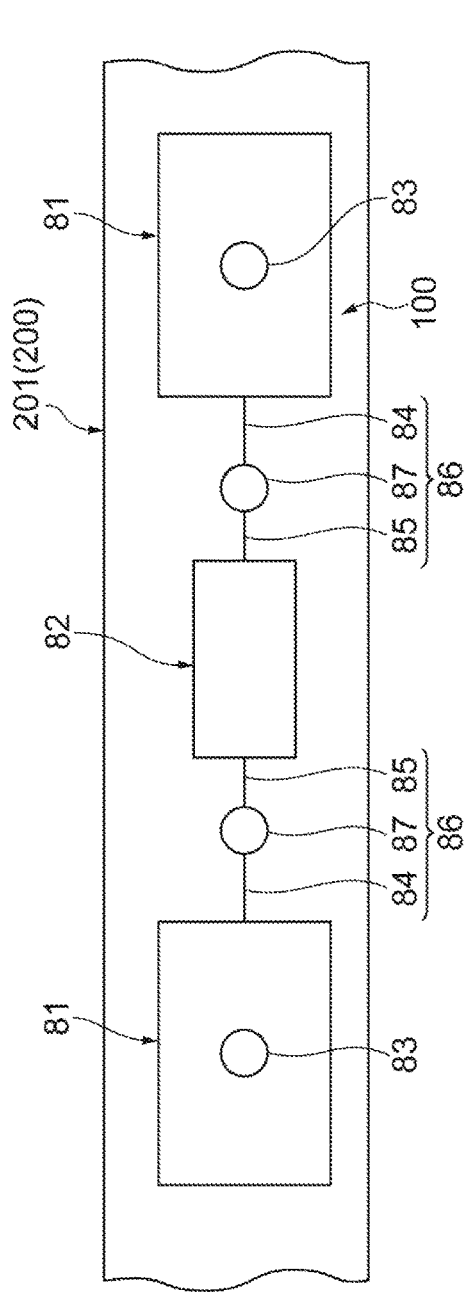
FIGS. 14(*a* and *b*) are diagrams showing the main part of a moving body system according to a modification.
Figure 14B:
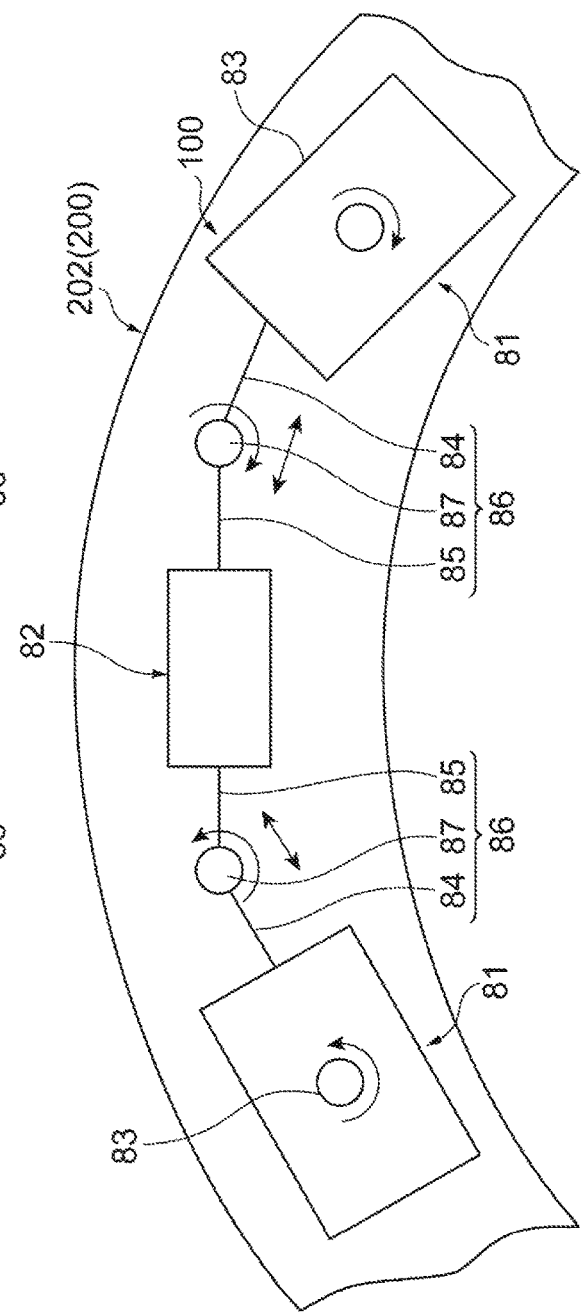

The example may further include the following configuration (see FIGS. 14(*a* and *b*) and 15).

Figure 15:
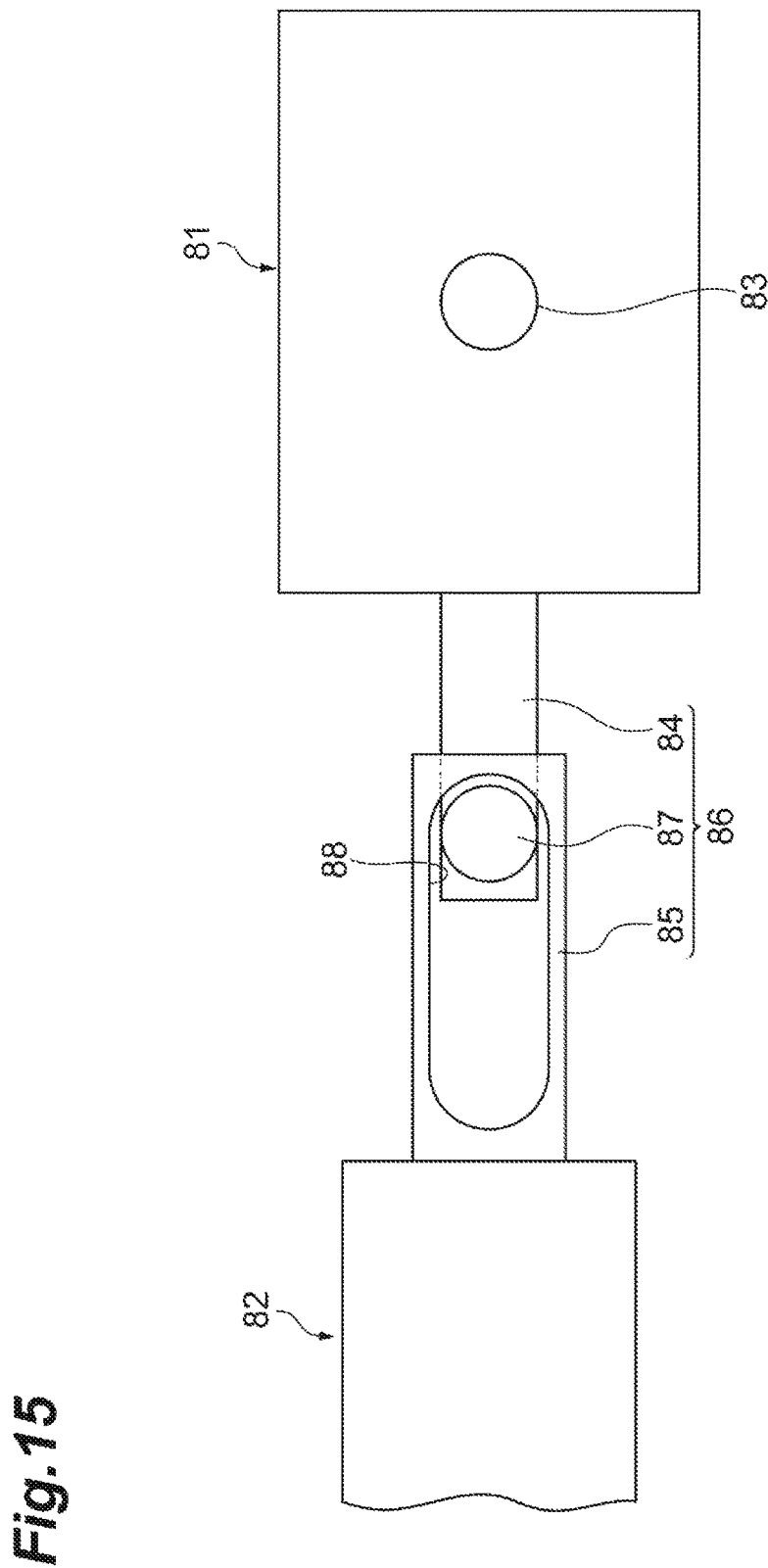
FIG. 15 is an enlarged view of the peripheral structure of the coupler shown in FIGS. 14(*a* and *b*).

FIGS. 14(*a* and *b*) are diagrams showing the main part of a moving body system according to a modification. FIGS. 14(*a* and *b*) are schematic diagrams of the moving body 100 when the rail (magnetic pole path) 200 laid on the ceiling is viewed from below. FIG. 14(*a*) shows linear path traveling, in which the moving body 100 travels on a linear path 201. FIG. 14(*b*) shows curved path traveling, in which the moving body 100 travels on a curved path 202. FIG. 15 is an enlarged view of the peripheral structure of a coupler 86 shown in FIGS. 14(*a* and *b*).

As shown in FIG. 14(*a*) and FIG. 14(*b*), the moving body 100 includes two bogies (a first bogie and a second bogie) 81 and an intermediate body 82 positioned between these bogies 81. Each bogie 81 is configured to be rotatable on a bogie center shaft 83. Each bogie 81 is coupled to the intermediate body 82 through a coupler 86.

The coupler 86 includes a link 84 connected to one end of each bogie 81 in the moving direction of the vehicle body, a link 85 connected to each of both ends of the intermediate body 82 in the moving direction of the vehicle body, and a bearing 87 provided on the link 84 of each bogie 81. As shown in FIG. 15, the link 85 of the intermediate body 82 has an elongated hole 88 extending in the longitudinal direction. In the coupler 86, the bearing 87 of the link 84 is inserted in the elongated hole 88 of the link 85 whereby the link 84 is coupled with the link 85.

Such a coupler 86 couples each bogie 81 with the intermediate body 82 to integrate each bogie 81 and the intermediate body 82. The coupler 86 couples the link 84 and the link 85 to enable rotation and linear movement. In other words, in the coupler 86, the link 84 and the link 85 are relatively rotatable and linearly movable on the bearing 87 in the elongated hole 88.

One of two bogies 81 is provided with the first linear motor 11 and the first electrical angle detection sensor 21. The other of two bogies 81 is provided with the second linear motor 12 and the second electrical angle detection sensor 23. The intermediate body 82 is provided with the position detection sensor 22.

As described above, in the moving body 100, the position detection sensor 22 is provided in the intermediate body 82 disposed to be rotatable and linearly movable between two bogies 81 through the couplers 86. Thus, not only at the time of traveling on the linear path 201 (see FIG. 14(*a*)), but also at the time of traveling on the curved path 202 (see FIG. 14(*b*)), the portion between the link 84 and the link 85 rotates and linearly moves to follow a posture change of each vehicle body of the moving body 100. Also, while keeping the center of the magnetic pole path 200 (the center in the width direction of the magnetic pole path 200), the position detection sensor 22 can accurately detect the position of the moving body 100. In addition, a linear motor and an electrical angle sensor as a pair are disposed in each bogie 81. Thus, in the moving body 100, each bogie 81 can be independently driven, and the electrical angle of the linear motor can be detected without any problem.

When the moving body 100 is a carriage, a support (not shown) that supports an article to be conveyed may be installed in the intermediate body 82 in the same manner as in the position detection sensor 22. In this configuration, the position of the position detection sensor 22 corresponds to the position of the support (the article to be conveyed) (for example, at the same or close position) in the carriage. Thus, the conveyance of the article to be conveyed can be stably controlled. In particular, when a delicate article such as a semiconductor wafer is conveyed (for example, the carriage is a semiconductor carriage), the configuration in which the position detection sensor 22 and the support are disposed in the intermediate body 82 is effective.

As described above, the moving body may be configured as follows. That is, the moving body moves along a magnetic pole path having a magnetic pole section in which a plurality of pairs of magnetic poles including a north pole and a south pole are arranged and a magnetic pole absent section that lacks a magnetic pole. The magnetic pole path has a linear path and a curved path. The moving body includes a first linear motor driven by magnetic interaction with magnetic flux of the magnetic pole path, a second linear motor driven by magnetic interaction with magnetic flux of the magnetic pole path, a position detection sensor configured to detect the position of the moving body, a first electrical angle detection sensor configured to detect the electrical angle of the first linear motor, a second electrical angle detection sensor configured to detect the electrical angle of the second linear motor, a first bogie provided with the first linear motor and the first electrical angle detection sensor, a second bogie provided with the second linear motor and the second electrical angle detection sensor, and an intermediate body disposed between the first bogie and the second bogie through coupling members and provided with the position detection sensor.

The moving body may move along a magnetic pole path having a magnetic pole section in which a plurality of pairs of magnetic poles including a north pole and a south pole are arranged and a magnetic pole absent section that lacks a magnetic pole. The moving body may include a plurality of linear motors including a first linear motor driven by magnetic interaction with magnetic flux of the magnetic pole path, a position detection sensor configured to detect the position of the moving body, a first electrical angle detection sensor disposed at a position different from the position detection sensor in the path direction of the magnetic pole path and configured to detect the electrical angle of the first linear motor, and a control unit. When one of the position detection sensor and the first electrical angle detection sensor is positioned at the magnetic pole absent section, the controller allows the other sensor to serve both to detect the position of the moving body and detect the electrical angle of the first linear motor.

In the moving body, a plurality of linear motors may include a second linear motor disposed at a position different from the first linear motor in the path direction of the magnetic pole path. The moving body may further include a second electrical angle detection sensor disposed to sandwich the position detection sensor in cooperation with the first electrical angle detection sensor in the path direction and configured to detect the electrical angle of the second linear motor. When the position detection sensor is positioned at the magnetic pole absent section, the control unit may switch from the position detection sensor to one of the first electrical angle detection sensor and the second electrical angle detection sensor to allow the switched sensor to serve both to detect the position of the moving body and detect the electrical angle of the first linear motor.

INDUSTRIAL APPLICABILITY

Even when any one of the position detection sensor and the electrical angle detection sensors is positioned at a magnetic pole absent section, the position of the moving body or the electrical angle of the corresponding linear motor can be detected.

The invention claimed is:

1. A moving body configured to move along a magnetic pole path having a magnetic pole section in which a plurality of pairs of magnetic poles including a north pole and a south pole are arranged and a magnetic pole absent section lacking a magnetic pole, the moving body comprising:
   a plurality of linear motors including a first linear motor driven by magnetic interaction with magnetic flux of the magnetic pole path:
   a position detection sensor configured to detect a position of the moving body;
   a first electrical angle detection sensor disposed at a position different from the position detection sensor in a path direction of the magnetic pole path and configured to detect an electrical angle of the first linear motor; and
   a control unit configured to, when one of the position detection sensor and the first electrical angle detection sensor is positioned at the magnetic pole absent section, use an other of the position detection sensor and the first electrical angle detection sensor both to detect a position of the moving body and detect an electrical angle of the first linear motor.

2. The moving body according to claim 1, wherein
   the linear motors comprise a second linear motor disposed at a position different from the first linear motor in the path direction of the magnetic pole path,
   the moving body further comprises a second electrical angle detection sensor disposed to sandwich the position detection sensor together with the first electrical angle detection sensor in the path direction, and the second electrical angle detection sensor is configured to detect an electrical angle of the second linear motor, and
   when the position detection sensor is positioned at the magnetic pole absent section, the control unit switches from the position detection sensor to one of the first electrical angle detection sensor and the second electrical angle detection sensor to use the switched sensor both to detect a position of the moving body and detect an electrical angle of the first linear motor.

3. The moving body according to claim 2, wherein
   the magnetic pole path comprises a linear path and a curved path,
   the magnetic pole absent section is disposed in proximity to a coupling portion between the linear path and the curved path, and
   when the moving body moves from the linear path toward the curved path and the position detection sensor is positioned at the magnetic pole absent section, the control unit switches to whichever of the first electrical angle detection sensor and the second electrical angle detection sensor is positioned on a back side in a moving direction of the moving body.

4. The moving body according to claim 2, wherein
   the position detection sensor is formed with a magnetic pole sensor configured to output a phase angle corresponding to the magnetic flux of the magnetic pole path,
   the first electrical angle detection sensor is formed with the magnetic pole sensor configured to output the phase angle corresponding to the magnetic flux of the magnetic pole path, and the moving body further comprises a conversion unit configured to obtain the electrical angle of the first linear motor by adding an offset angle corresponding to a distance between the first linear motor and the first electrical angle detection sensor to the phase angle output by the first electrical angle detection sensor.

5. The moving body according to claim 2, further comprising a magnetic pole absent section detecting unit configured to detect the magnetic pole absent section.

6. The moving body according to claim 1, further comprising a section length estimating unit configured to estimate a section length of the magnetic pole absent section, based on a moving distance of the moving body for a period during which the one of the position detection sensor and the first electrical angle detection sensor is positioned in the magnetic pole absent section.

7. The moving body according to claim 6, further comprising a moving distance measuring unit configured to measure the moving distance of the moving body from output of the other sensor of the position detection sensor and the first electrical angle detection sensor,
wherein the section length estimating unit estimates the section length of the magnetic pole absent section, based on the moving distance measured by the moving distance measuring unit.

8. The moving body according to claim 1, wherein
the first electrical angle detection sensor, the first linear motor, and the position detection sensor are disposed in order from a front side in a moving direction of the moving body, and
the moving body further comprises:
a moving distance measuring unit configured to measure a moving distance of the moving body from output of the position detection sensor after the control unit switches from the first electrical angle detection sensor to the position detection sensor when the first electrical angle detection sensor is positioned at the magnetic pole absent section; and
a drive control unit configured to stop the first linear motor when the moving distance measured by the moving distance measuring unit reaches a predetermined distance.

9. The moving body according to claim 1, wherein
the first electrical angle detection sensor, the first linear motor, and the position detection sensor are disposed in order from a back side in a moving direction of the moving body,
the moving body further comprises a smoothing unit configured to gradually increase a synthesis ratio of output of the first electrical angle detection sensor to output of the position detection sensor while synthesizing the output of the position detection sensor and the output of the first electrical angle detection sensor when the first electrical angle detection sensor exits from the magnetic pole absent section, and
the control unit gradually switches from the position detection sensor to the first electrical angle detection sensor by switching to the smoothing unit when the first electrical angle detection sensor exits from the magnetic pole absent section.

10. The moving body according to claim 1, wherein
the linear motors include a second linear motor disposed at a position different from the first linear motor in the path direction of the magnetic pole path,
the moving body further comprises a second electrical angle detection sensor configured to detect an electrical angle of the second linear motor, and
the first electrical angle detection sensor, the first linear motor, the position detection sensor, the second linear motor, and the second electrical angle detection sensor are disposed in order in the path direction.

11. The moving body according to claim 1, wherein
the position detection sensor is formed with a magnetic pole sensor configured to output a phase angle corresponding to the magnetic flux of the magnetic pole path,
the first electrical angle detection sensor is formed with the magnetic pole sensor configured to output the phase angle corresponding to the magnetic flux of the magnetic pole path, and
the moving body further comprises a conversion unit configured to obtain an electrical angle of the first linear motor by adding an offset angle corresponding to a distance between the first linear motor and the first electrical angle detection sensor to the phase angle output by the first electrical angle detection sensor.

12. The moving body according to claim 1, further comprising a magnetic pole absent section detecting unit configured to detect the magnetic pole absent section.

13. A moving body configured to move along a magnetic pole path having a magnetic pole section in which a plurality of pairs of magnetic poles including a north pole and a south pole are arranged and a magnetic pole absent section lacking a magnetic pole, the moving body comprising:
a first linear motor driven by magnetic interaction with magnetic flux of the magnetic pole path;
a second linear motor driven by magnetic interaction with the magnetic flux of the magnetic pole path;
a position detection sensor configured to detect a position of the moving body;
a first electrical angle detection sensor configured to detect the electrical angle of the first linear motor;
a second electrical angle detection sensor configured to detect the electrical angle of the second linear motor;
a first bogie provided with the first linear motor and the first electrical angle detection sensor;
a second bogie provided with the second linear motor and the second electrical angle detection sensor; and
an intermediate body disposed between the first bogie and the second bogie through coupling members and provided with the position detection sensor.

14. The moving body according to claim 13, wherein the magnetic pole path has a linear path and a curved path.

15. A moving body configured to move along a magnetic pole path having a magnetic pole section in which a plurality of pairs of magnetic poles including a north pole and a south pole are arranged and a magnetic pole absent section lacking a magnetic pole, the moving body comprising:
a first linear motor driven by magnetic interaction with magnetic flux of the magnetic pole path;
a second linear motor driven by magnetic interaction with the magnetic flux of the magnetic pole path;
a first magnetic pole sensor configured to detect the electrical angle of the first linear motor;
a second magnetic pole sensor configured to detect the electrical angle of the second linear motor;
a third magnetic pole sensor configured to detect the position of the moving body;
a first bogie provided with the first linear motor and the first magnetic pole sensor;
a second bogie provided with the second linear motor and the second magnetic pole sensor; and an intermediate body disposed between the first bogie and the second bogie through coupling members and provided with the third magnetic pole sensor.

16. The moving body according to claim 15, wherein the magnetic pole path has a linear path and a curved path.

* * * * *